(12) United States Patent
Kim et al.

(10) Patent No.: US 9,858,937 B2
(45) Date of Patent: Jan. 2, 2018

(54) METHOD FOR TRANSMITTING AND RECEIVING SOUND WAVES USING TIME-VARYING FREQUENCY-BASED SYMBOL, AND APPARATUS USING THE SAME

(71) Applicant: SOUNDLLY INC., Incheon (KR)

(72) Inventors: Tae Hyun Kim, Seoul (KR); Hye Won Lee, Seoul (KR); Sung Hyun Choi, Seoul (KR)

(73) Assignee: SOUNDLLY INC., Incheon (KR)

(*) Notice: Subject to any disclaimer, the term of this patent is extended or adjusted under 35 U.S.C. 154(b) by 0 days.

(21) Appl. No.: 14/916,798

(22) PCT Filed: Sep. 5, 2014

(86) PCT No.: PCT/KR2014/008397
§ 371 (c)(1),
(2) Date: Mar. 4, 2016

(87) PCT Pub. No.: WO2015/034316
PCT Pub. Date: Mar. 12, 2015

(65) Prior Publication Data
US 2016/0210973 A1 Jul. 21, 2016

(30) Foreign Application Priority Data

Sep. 6, 2013 (KR) .......... 10-2013-0107604

(51) Int. Cl.
*H04B 1/00* (2006.01)
*G10L 19/018* (2013.01)
(Continued)

(52) U.S. Cl.
CPC .......... *G10L 19/018* (2013.01); *H04B 11/00* (2013.01); *H04B 2001/6912* (2013.01)

(58) Field of Classification Search
CPC .......... H04B 11/00; H04B 2001/6912
See application file for complete search history.

(56) References Cited

U.S. PATENT DOCUMENTS

| 6,628,724 B2 | 9/2003 | Bannasch et al. .......... 375/259 |
| 2005/0226312 A1* | 10/2005 | Koslar .......... H04B 1/69 375/142 |
| 2014/0192622 A1* | 7/2014 | Rowe .......... G01S 5/18 367/117 |

FOREIGN PATENT DOCUMENTS

| JP | 2013-044612 | 3/2013 | .......... G01M 3/24 |
| KR | 10-2001-0072845 | 7/2001 | .......... H04B 11/00 |

(Continued)

OTHER PUBLICATIONS

Mason et al., (2008). "Detection, synchronization, and doppler scale estimation with multicarrier waveforms in underwater acoustic communication". IEEE JSAC 26:9 See abstract, section 1.

(Continued)

*Primary Examiner* — Duc Nguyen
*Assistant Examiner* — Kile Blair
(74) *Attorney, Agent, or Firm* — Harness, Dickey & Pierce, P.L.C.

(57) ABSTRACT

A method for transmitting sound waves using a time-varying frequency-based symbol includes the steps of: storing waveform data in a digital form; converting the waveform data in the digital form into an analog signal; and outputting the analog signal as sound waves through a speaker. Herein, the waveform data in the digital form includes a symbol the frequency of which changes with time within a sound wave band.

11 Claims, 21 Drawing Sheets

(51) Int. Cl.
*H04B 11/00* (2006.01)
*H04B 1/69* (2011.01)

(56) References Cited

FOREIGN PATENT DOCUMENTS

| KR | 10-2012-0038120 | 4/2012 | ............ G06Q 10/06 |
| KR | 10-2012-0045613 | 5/2012 | ............ H04B 11/00 |
| KR | 10-2012-0053286 | 5/2012 | ............ A01K 93/00 |
| KR | 10-2013-0014086 | 2/2013 | ............ H04L 27/00 |
| KR | 10-2013-0064014 | 6/2013 | ............ G06Q 50/10 |

OTHER PUBLICATIONS

International Search Report (ISR) dated Oct. 27, 2014 in PCT/KR2014/008397.
Korean Office Action from corresponding Korean Application No. 10-2013-0107694 dated Jul. 27, 2014 and its English translation.

\* cited by examiner

• Training sequence formed of two or more signals (a) Training sequence formed of one time-varying signal (left); and Result of demodulation (right)

(b) Training sequence formed of two time-varying signals with t1 time interval (left); and Result of demodulation (right)

METHOD FOR TRANSMITTING AND RECEIVING SOUND WAVES USING TIME-VARYING FREQUENCY-BASED SYMBOL, AND APPARATUS USING THE SAME

CROSS-REFERENCE TO RELATED APPLICATIONS

This application is a national phase application of PCT Application No. PCT/KR2014/008397, filed on 5 Sep. 2014, which claims benefit of Korean Patent Application 10-2013-0107604, filed on 6 Sep. 2013. The entire disclosure of the applications identified in this paragraph are incorporated herein by reference.

FIELD

The present disclosure relates to a method for transmitting and receiving sound waves using a time-varying frequency-based symbol, and an apparatus and an application using the same.

BACKGROUND ART

In recent years, techniques for providing information using sound waves are being studied.

For example, Korean Patent Application Publication No. 2013-0064014 (Jun. 17, 2013) (titled "System, Server, Method, and Recording Medium for Providing Location-Based Service Using Sound wave Communication") discloses a system for providing a location-based service using sound wave communication.

In another example, Korean Patent Application Publication No. 2012-0045613 (May 9, 2012) (titled "System and Method for Transceiving Data In Audible Frequency Band Sound Wave Communication, and Apparatus Applying the Same") discloses a method and apparatus for transceiving data in an audible frequency band.

DISCLOSURE

Technical Problem

One or more aspects of the exemplary embodiments provide a method for transmitting and receiving sound waves using a time-varying frequency-based symbol, which has excellent auto correlation and cross correlation and thus facilitates a transmission distance/synchronization, and an apparatus and an application using the same.

One or more aspects of the exemplary embodiments also provide a method for transmitting and receiving sound waves using a time-varying frequency-based symbol, by which transmitting and receiving apparatuses can be simply implemented, and an apparatus and an application using the same.

One or more aspects of the exemplary embodiments also provide a method for transmitting and receiving sound waves using a time-varying frequency-based symbol, which is capable of performing sound wave communication even in an environment in which a frequency characteristic of a speaker and a microphone deteriorates as the frequency increases, and an apparatus and an application using the same.

One or more aspects of the exemplary embodiments also provide a method for transmitting and receiving sound waves using a time-varying frequency-based symbol, which is capable of performing sound wave communication efficiently even when a frequency response of a speaker, a microphone, and an amplifier is irregular, since the method for transmitting and receiving sound waves does not depend on a specific frequency, and an apparatus and an application using the same.

One or more aspects of the exemplary embodiments also provide a method for transmitting and receiving sound waves using a time-varying frequency-based symbol, which is capable of performing sound wave communication and also easily measuring a distance, and an apparatus and an application using the same.

One or more aspects of the exemplary embodiments also provide an application using sound waves, which can control a speaker and a microphone independently from an operating system (OS).

Technical Solution

According to an aspect of an exemplary embodiment, there is provided a method for transmitting sound waves using a time-varying frequency-based symbol, the method including: converting digital waveform data into an analogue signal; amplifying, by an amplifier, the analogue signal; and outputting, by a speaker, the analogue signal amplified by the amplifier as sound waves in a sound wave band of 20 Hz to 24 kHz, wherein the digital waveform data includes a first digital code the frequency of which linearly or nonlinearly increases or decreases with time considering a frequency response characteristic of the speaker and the amplifier and a frequency response characteristic of a microphone to receive the sound waves outputted from the speaker, and a second digital code which is configured considering an auto correlation in the sound wave band of 20 Hz to 24 kHz and a cross correlation with the first digital code.

According to an aspect of another exemplary embodiment, there is provided an apparatus for transmitting sound waves using a time-varying frequency-based symbol, the apparatus including: a D/A converter configured to convert digital waveform data into an analogue signal; and an outputter including an amplifier configured to amplify the analogue signal, and a speaker configured to output the analogue signal amplified by the amplifier as sound waves in a sound wave band of 20 Hz to 24 kHz, wherein the digital waveform data includes a first digital code the frequency of which linearly or nonlinearly increases or decreases with time considering a frequency response characteristic of the speaker and the amplifier and a frequency response characteristic of a microphone to receive the sound waves outputted from the speaker, and a second digital code which is configured considering an auto correlation in the sound wave band of 20 Hz to 24 kHz and a cross correlation with the first digital code.

According to an aspect of another exemplary embodiment, there is provided a method for generating digital waveform data from digital bit data formed of "1" and "0," the method including: modulating the digital bit data formed of "1" and "0" into a symbol having a characteristic that the frequency of the symbol changes with time within a sound wave band; and adding a training sequence to the modulated data, wherein the digital waveform data generated by the modulating and the adding the training sequence is converted into an analogue signal, is amplified by an amplifier, and then is outputted through a speaker as sound waves in a sound wave band of 20 Hz to 24 kHz, wherein the symbol includes a first digital code the frequency of which linearly or nonlinearly increases or decreases with time considering a frequency response characteristic of the speaker and the amplifier and a frequency response characteristic of a microphone to receive the sound waves outputted from the speaker, and a second digital code which is configured considering an auto correlation in the sound wave band of 20 Hz to 24 kHz and a cross correlation with the first digital code.

According to an aspect of another exemplary embodiment, there is provided a method for receiving sound waves, the method including: receiving, by a microphone, sound waves which have been amplified by an amplifier and outputted by a speaker in a sound wave band of 20 Hz to 24 kHz, and outputting the sound waves as an analogue signal; and converting the analogue signal outputted by the microphone into digital waveform data, wherein the digital waveform data includes at least one time-varying up signal the frequency of which linearly or nonlinearly increases with time, and at least one time-varying down signal the frequency of which linearly or nonlinearly decreases with time, wherein the time-varying up signal is configured such that the frequency linearly or nonlinearly increases with time considering a frequency response characteristic of the speaker and the amplifier and a frequency response characteristic of the microphone, and wherein the time-varying down signal is configured such that the frequency linearly or nonlinearly decreases with time considering an auto correlation in the sound wave band of 20 Hz to 24 kHz and a cross correlation with the time-varying up signal.

According to an aspect of another exemplary embodiment, there is provided a computer readable medium recording an application for executing: in a computer including a microphone to receive sound waves which are amplified by an amplifier and outputted by a speaker in a sound wave band of 20 Hz to 24 kHz, and convert the sound waves into an electric signal, and an A/D converter to convert the electric signal converted by the microphone into digital waveform data, detecting an information part (hereinafter, packet data) from the digital waveform data; and demodulating the detected packet data into digital bit data, wherein the digital waveform data includes a first digital code which is configured such that the frequency of the first digital code linearly or nonlinearly increases with time considering a frequency response characteristic of the speaker and the amplifier and a frequency response characteristic of the microphone to receive the sound waves, and a second digital code which is configured such that the frequency of the second digital code linearly or nonlinearly decreases with time considering an auto correlation in the sound wave band of 20 Hz to 24 kHz and a cross correlation with the first digital code, wherein the application uses a time-varying symbol the frequency of which changes with time when demodulating, wherein the time-varying symbol in the demodulating is a time-varying up signal the frequency of which linearly or nonlinearly increases with time, and a time-varying down signal the frequency of which linearly or nonlinearly decreases with time, and wherein the application uses the time-varying symbol when detecting the packet data.

According to an aspect of another exemplary embodiment, there is provided an apparatus for receiving sound waves using a time-varying frequency-based symbol, the apparatus including: a microphone configured to receive sound waves which have been amplified by an amplifier and outputted by a speaker in a sound wave band of 20 Hz to 24 kHz, and convert the sound waves into an electric signal; an A/D converter configured to convert the electric signal converted by the microphone into digital waveform data, a packet detector configured to detect an information part (hereinafter, a data packet) from the digital waveform data converted by the A/D converter; and a data demodulator configured to demodulate the data packet detected by the packet detector into digital bit data, wherein the frequency of the digital waveform data changes with time, and wherein the digital waveform data includes a first digital code which is configured such that the frequency of the first digital code linearly or nonlinearly increases with time considering a frequency response characteristic of the speaker and the amplifier and a frequency response characteristic of the microphone, and a second digital code which is configured such that the frequency of the second digital code linearly or nonlinearly decreases considering an auto correlation in the sound wave band of 20 Hz to 24 kHz and a cross correlation with the first digital code.

Advantageous Effects

According to one or more exemplary embodiments, auto correlation and cross correlation are excellent and thus measurement of transmission distance/synchronization can be easily performed.

According to one or more exemplary embodiments, transmitting and receiving apparatuses can be simply implemented. In particular, compared with Phase Shift Keying (PSK), the apparatus and method do not require a Phase Lock Loop (PLL) since a precise and continuous phase synchronization process is not required.

According to one or more exemplary embodiments, the method and apparatus is capable of performing sound wave communication even in an environment in which a frequency characteristic of a speaker and a microphone deteriorates as the frequency increases.

According to one or more exemplary embodiments, when a high frequency is used by Frequency Shift Keying (FSK), signals can be transmitted and received without deterioration of performance which may be caused by distortion in reception signals according to characteristics of a speaker and a microphone between frequency bands, According to one or more exemplary embodiments, sound wave communication can be efficiently performed even when a frequency response of a speaker, a microphone, and an amplifier is irregular, since the method according to the embodiments do not depend on a specific frequency.

According to one or more exemplary embodiments, distance measurement as well as sound wave communication can be performed easily.

According to one or more exemplary embodiments, since the method can be implemented as an application which can control a speaker and a microphone independently from an operating system (OS), the method can be applied without any restriction to the operating system.

ILLUSTRATION OF THE REFERENCE NUMBERS

1: 100: Microphone 2: Memory
3: Application 4: Computer processor
5: Hardware and Software Resources 12: Storage
14: Waveform Data generator 16: D/A Converter
18: Outputter 200: A/D Converter
300: Packet Detector 400: Data Demodulator

BEST MODE

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will be understood that, when an element is referred to as being "on" another element, the element can be directly on another element or intervening elements.

If the terms such as 'first' and 'second' are used to describe elements, these element should not be limited by such terms. These terms are used for the purpose of distinguishing one element from another element only. The exemplary embodiments include their complementary embodiments.

Figure 1:
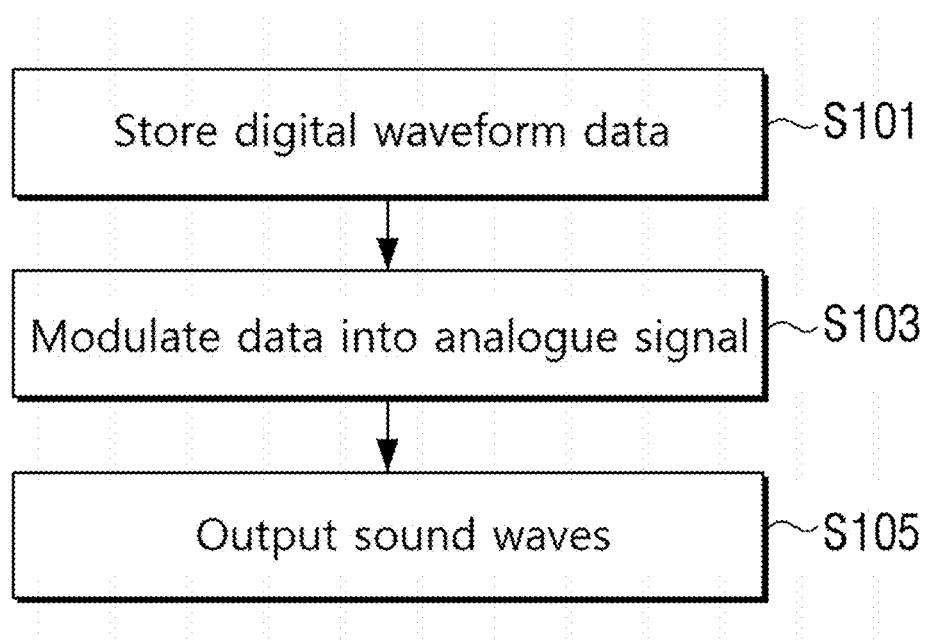
FIG. 1 is a view to explain a method for transmitting sound waves using a time-varying frequency-based symbol according to an exemplary embodiment of the present disclosure.

FIG. 1 is a view to explain a method for transmitting sound waves using a time-varying frequency-based symbol according to an exemplary embodiment of the present disclosure.

Referring to FIG. 1, the method for transmitting sound waves using the time-varying frequency-based symbol according to an exemplary embodiment of the present disclosure (hereinafter, referred to as a "sound wave transmitting method") may include the steps of: storing waveform data in a digital form (S101); converting the waveform data in the digital form into an electric signal in an analogue form (hereinafter, referred to as an electric signal or an analogue signal) (S103); and outputting the electric signal as sound waves through a speaker (105). Herein, the electric signal (or analogue signal) converted in step S103 may have a waveform data form which will be described below with reference to FIG. 2.

The waveform data in the digital form stored in step S101 includes at least one symbol (i.e., time-varying frequency-based symbol) which is formed of signals having a frequency changing with time within a sound wave band.

In step S103, the waveform data in the digital form stored in step S101 is converted into the electric signal (that is, waveform data in the analogue form).

In step S105, the electric signal converted in step S103 is outputted as sound waves.

Figure 2:
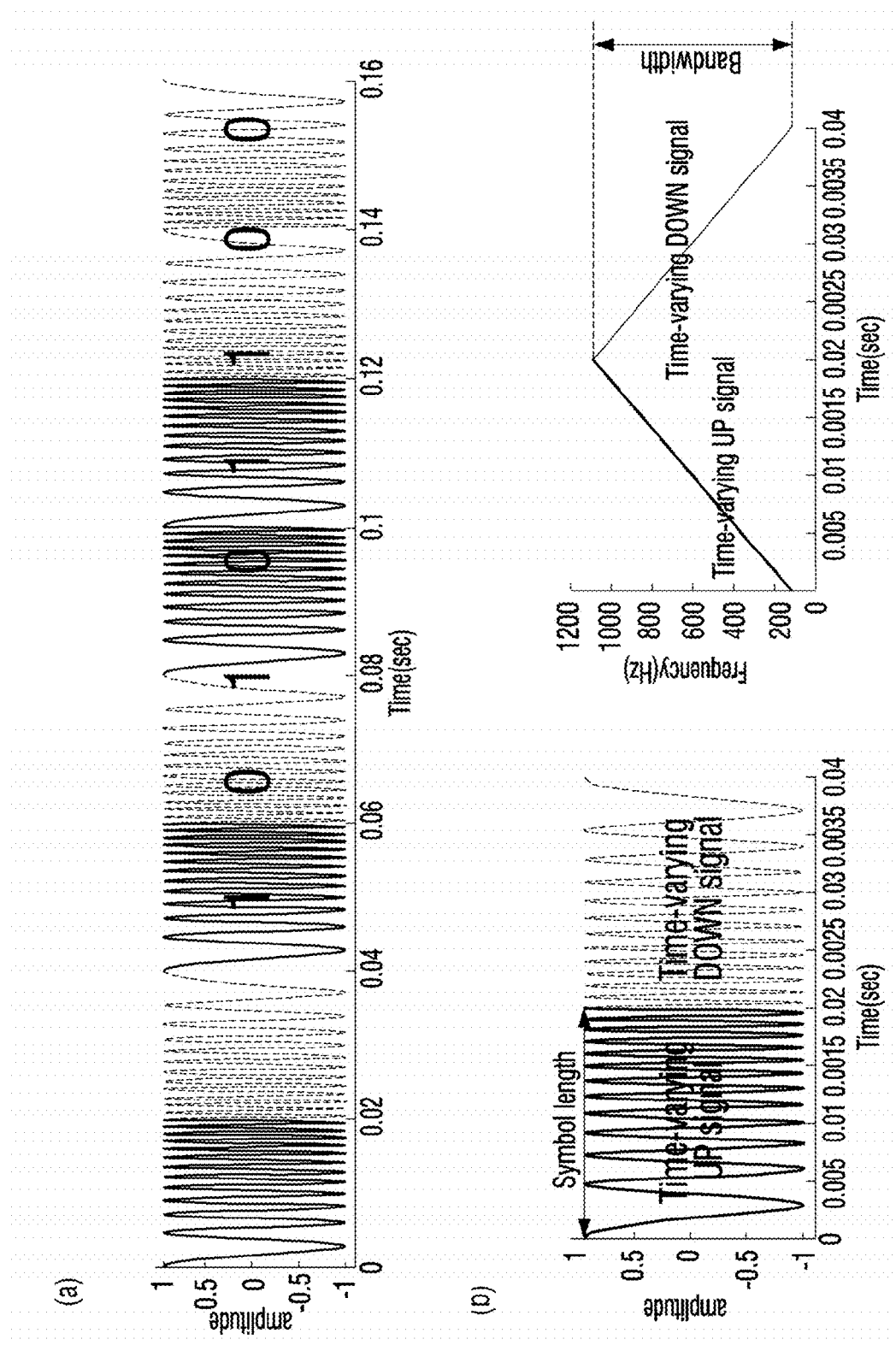
FIG. 2 (*a*) and 2 (*b*) are views to explain waveform data in a digital form according to an exemplary embodiment of the present disclosure.

FIG. 2 (a) and 2 (b) are views to explain waveform data according to an exemplary embodiment of the present disclosure.

In this specification, the waveform data refers to data which is configured to have a frequency characteristic that a frequency changes (for example, increases or decreases) with time as shown in FIG. 2 (a).

For the purpose of explaining the present disclosure, the waveform data in the digital form or the waveform data in the analogue form as shown in FIG. 2 (a) will be used.

In addition, in this specification, the waveform data in the digital form refers to digital data which is configured to have a frequency characteristic that a frequency changes (for example, increases or decreases) with time, and the waveform data in the analogue form refers to analogue data which is configured to have a frequency characteristic that a frequency changes (for example, increases or decreases) with time, In addition, in this specification, the waveform data is used as a term indicating any one of the waveform data in the digital form and the waveform data in the analogue form or both of them.

When the waveform data in the digital form according to an exemplary embodiment of the present disclosure is converted into the analogue signal at any sampling rate of 44.1 kHz, 48 kHz, 88.2 kHz, 96 kHz, and 192 kHz, and at any quantization level of 8 bits, 16 bits, 20 bits, 24 bits, and 32 bits, the waveform in the analogue form according to an exemplary embodiment of the present disclosure is generated. To the contrary, when the waveform data in the analogue form according to an exemplary embodiment of the present disclosure is converted into digital data at any sampling rate of 44.1 kHz, 48 kHz, 88.2 kHz, 96 kHz, and 192 kHz, and at any quantization level of 8 bits, 16 bits, 20 bits, 24 bits, and 32 bits, the waveform in the digital form according to an exemplary embodiment of the present disclosure is generated.

The waveform data according to an exemplary embodiment of the present disclosure includes a time-varying signal-based symbol (hereinafter, referred to as a time-varying symbol).

The time-varying signal-based symbol according to an exemplary embodiment of the present disclosure may be data which has the feature that the frequency increases with time like a time-varying up signal, and data which has the feature that the frequency decreases with time like a time-varying down signal.

The time-varying signal-based symbol included in the digital waveform data according to an exemplary embodiment of the present disclosure may be any one of a digital code (hereinafter, referred to as a first digital code) which has the feature that the frequency increases with time like the time-varying up signal, and a digital code (hereinafter, referred to as a second digital code) which has the feature that the frequency decreases with time like the time-varying down signal.

The time-varying signal-based symbol included in the analogue waveform data according to an exemplary embodiment of the present disclosure may be any one of an analogue signal which has the feature that the frequency increases with time like the time-varying up signal, and an analogue signal which has the feature that the frequency decreases with time like the time-varying down signal.

For example, the time-varying up signal may have the feature that the frequency linearly or non-linearly increases with time, and the time-varying down signal may have the feature that the frequency linearly or non-linearly decreases with time.

In another example, the time-varying up signal may have the feature that the frequency exponentially increases with time, and the time-varying down signal may have the feature that the frequency exponentially decreases with time.

In another example, the time-varying signal may be normalized with an inverse number of a frequency response of analogue devices for transmitting and receiving sound waves, such as a speaker, a microphone, and an amplifier.

FIGS. 13 to 16 are views to explain time-varying symbols according to an exemplary embodiment of the present disclosure. In the drawings, a time-varying symbol is illustrated by way of an example.

Figure 12:
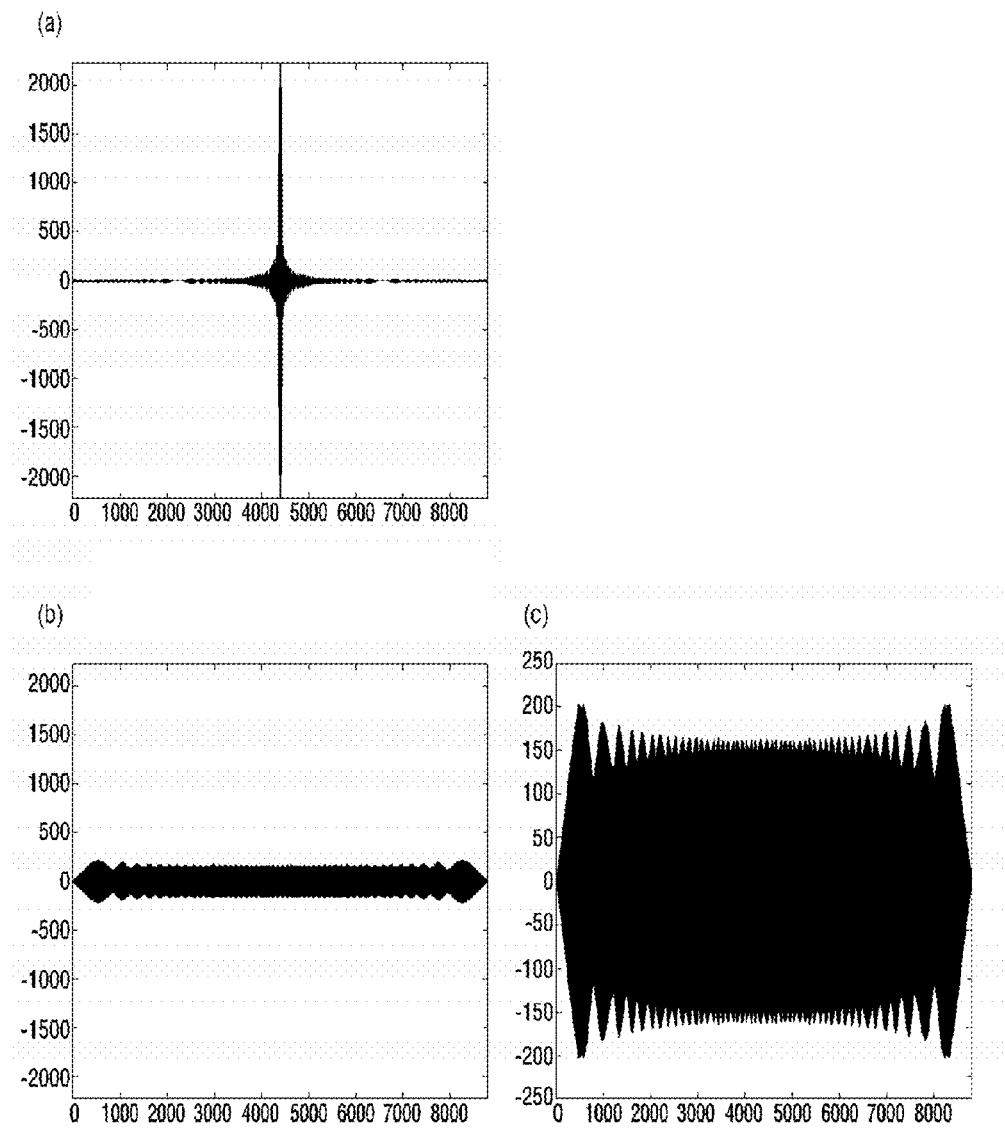
FIG. 12 is a view to explain a correlation characteristic of a time-varying signal according to an exemplary embodiment of the present disclosure.
Figure 13:
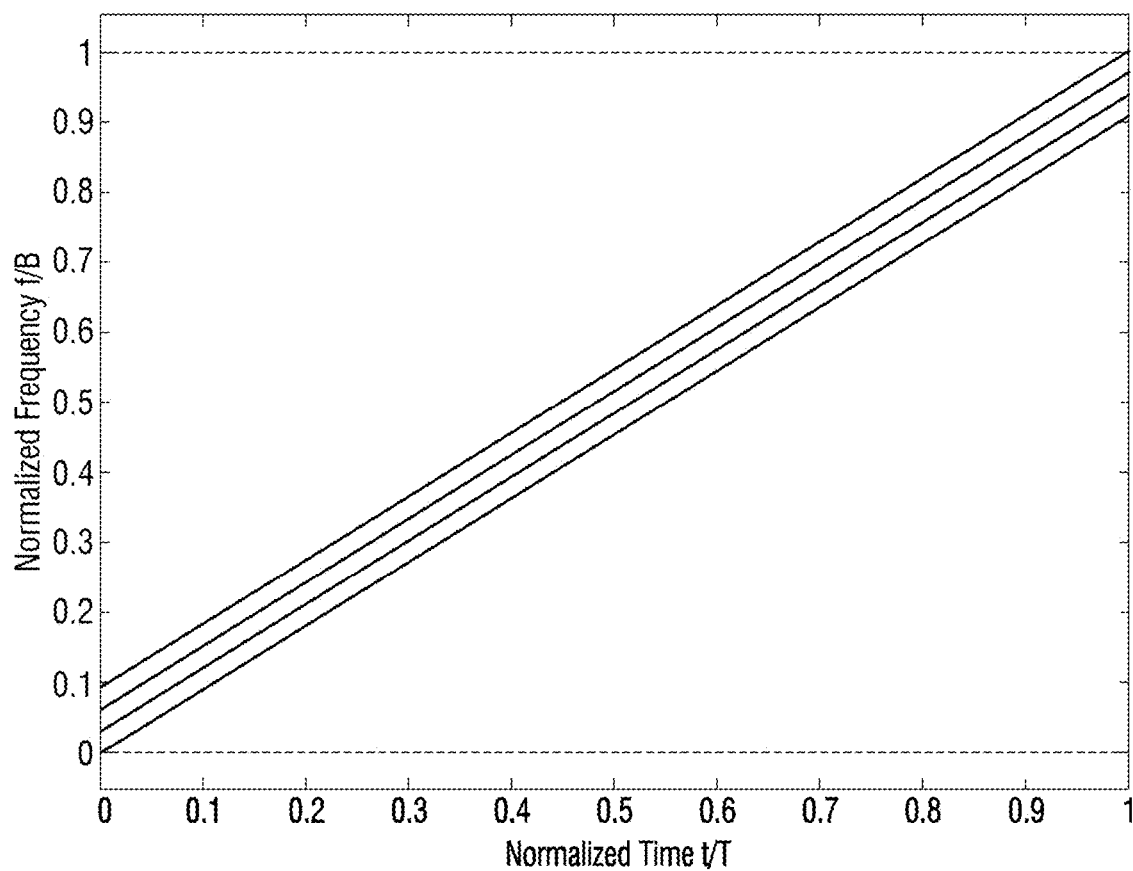
FIGS. 13 to 16 are views to explain a symbol according to an exemplary embodiment of the present disclosure.
Figure 14:
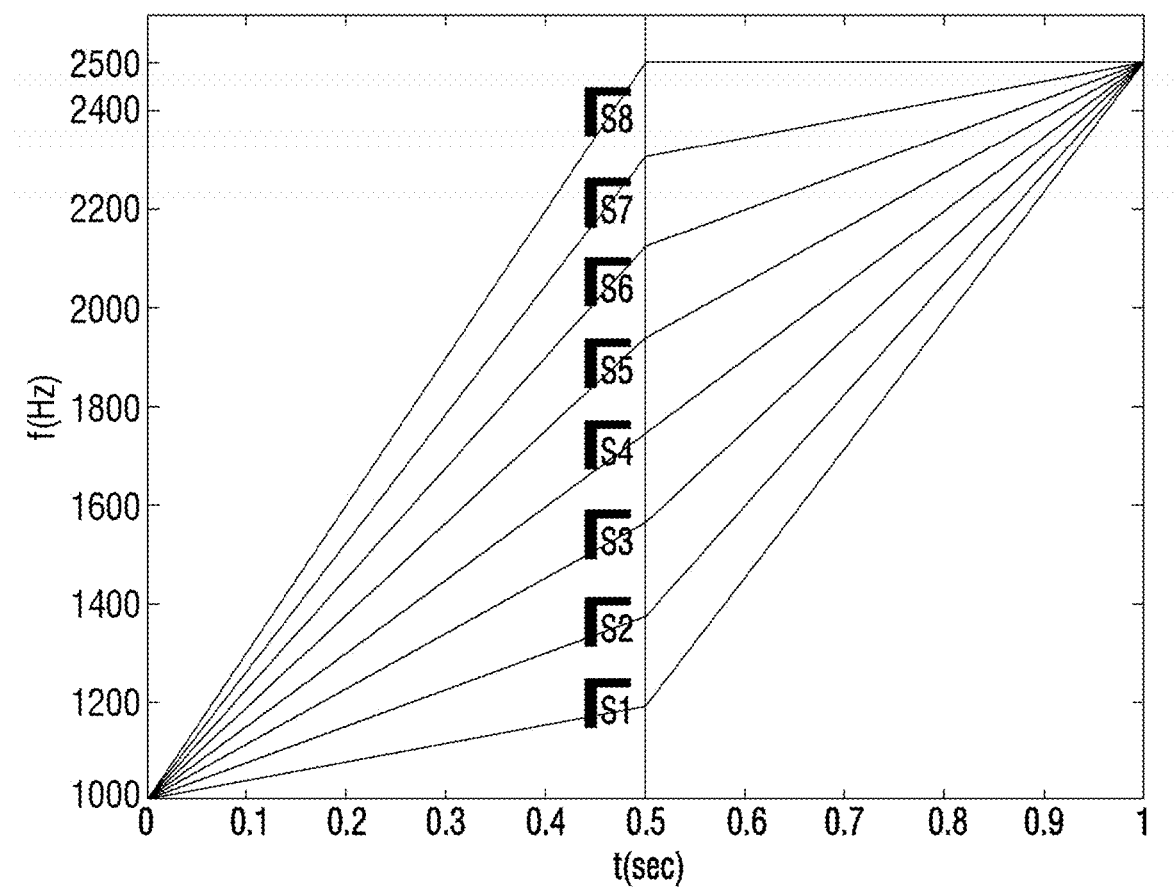
Figure 15:
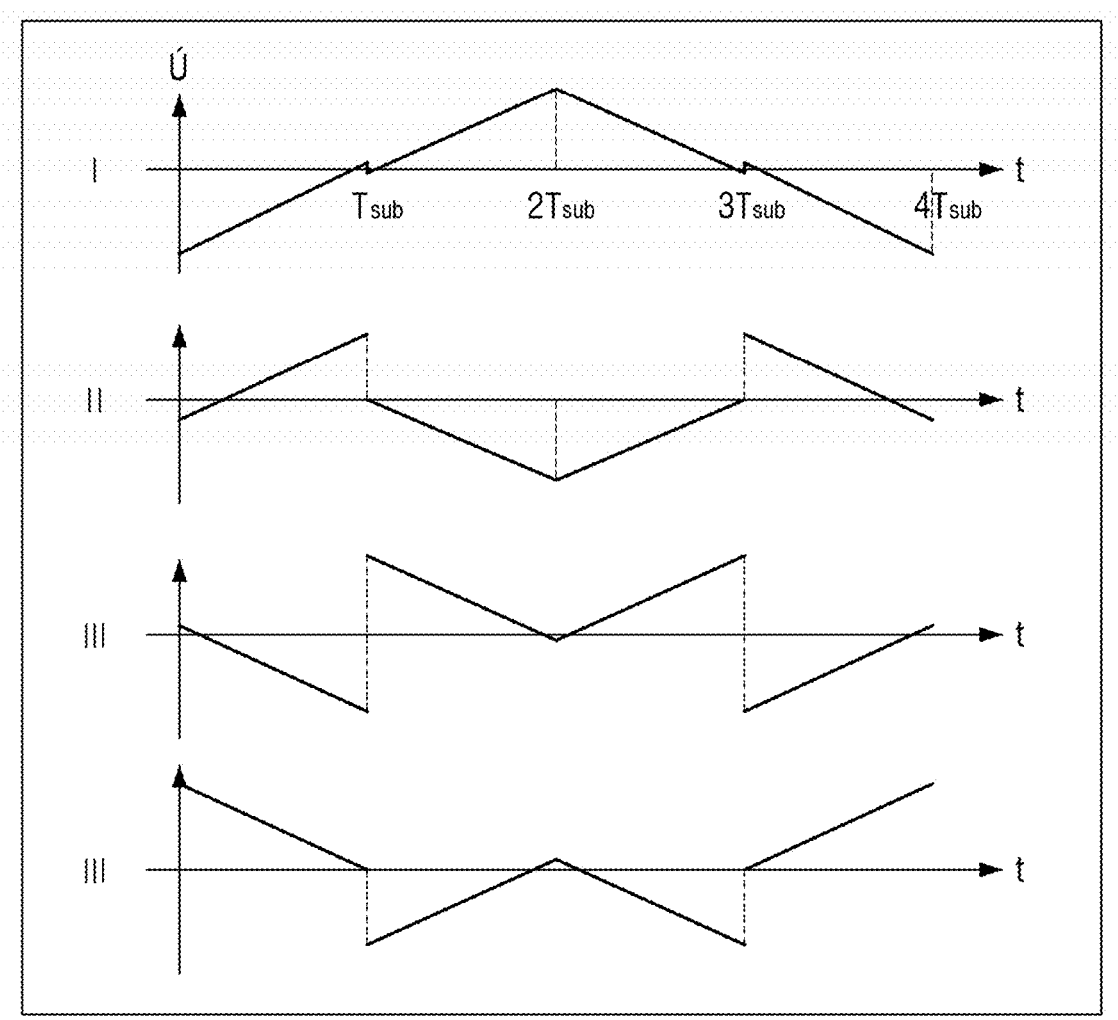
Figure 16:
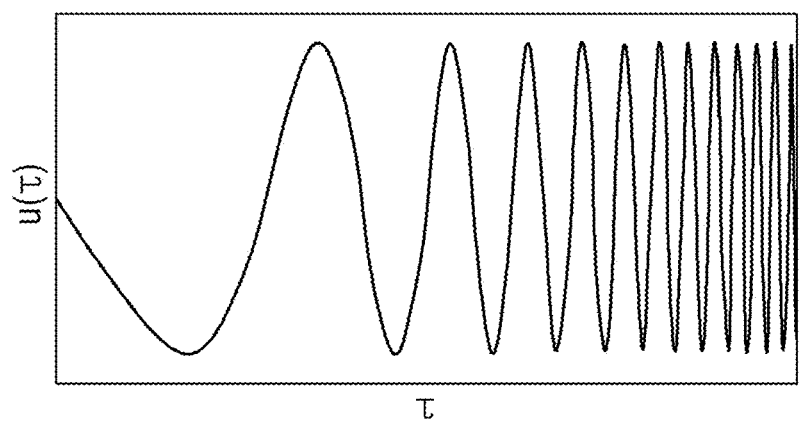
Figure 16:
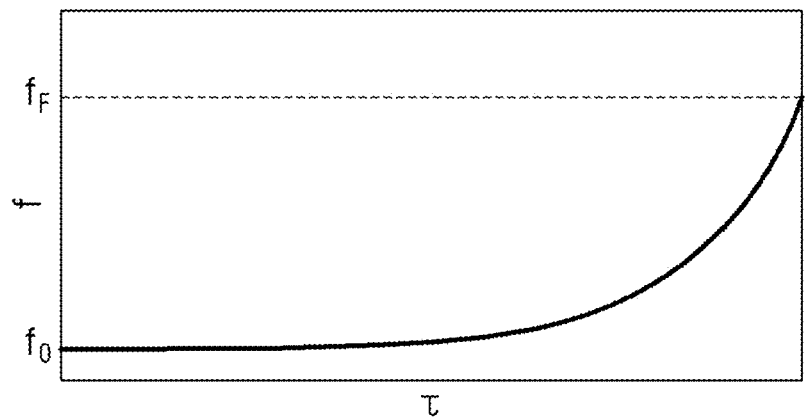
Figure 20:
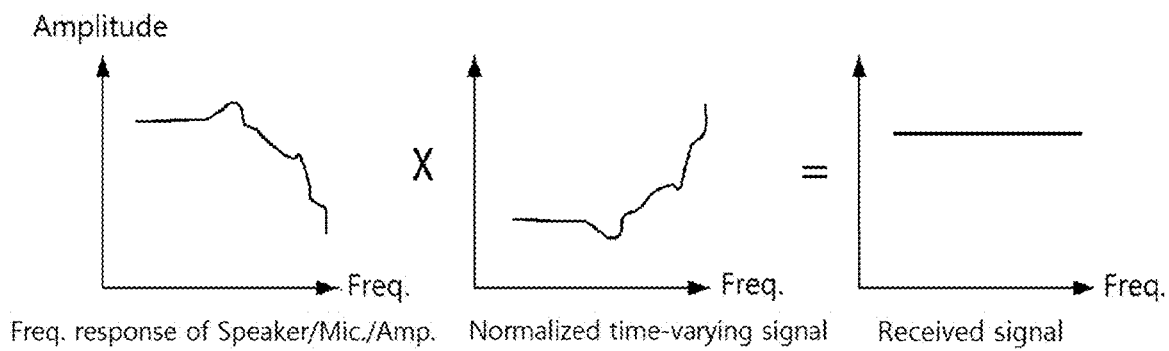
FIG. 20 is a view to explain a time-varying signal which is normalized with an inverse number of a frequency response of an analogue device such as a speaker, a microphone, and an amplifier.

FIG. 13 illustrates four time-varying symbols having excellent auto correlation and cross correlation characteristics, FIG. 14 illustrates eight time-varying symbols having excellent auto correlation and cross correlation characteristics, and FIG. 15 illustrates a new time-varying symbol which is configured by a combination of increasing or decreasing time-varying symbols. In addition, FIG. 16 illustrates a symbol which exponentially changes with time. FIG. 20 illustrates a symbol which is normalized with an inverse number of a frequency response of analogue devices for transmitting and receiving sound waves, such as a speaker, a microphone, and an amplifier. An excellent correlation characteristic will be explained below with reference to FIG. 12. The waveform data in the digital form may be configured to include at least one first digital code meaning "1" (or "0"), and include at least one second digital code meaning "0" (or "1").

Alternatively, according to another exemplary embodiment, the first digital code and the second digital code do not mean "1" or "0" and may indicate a distance between neighboring digital codes (corresponding to a phase in a frequency response)

The waveform data according to another exemplary embodiment of the present disclosure may further include a training sequence.

Figure 3:
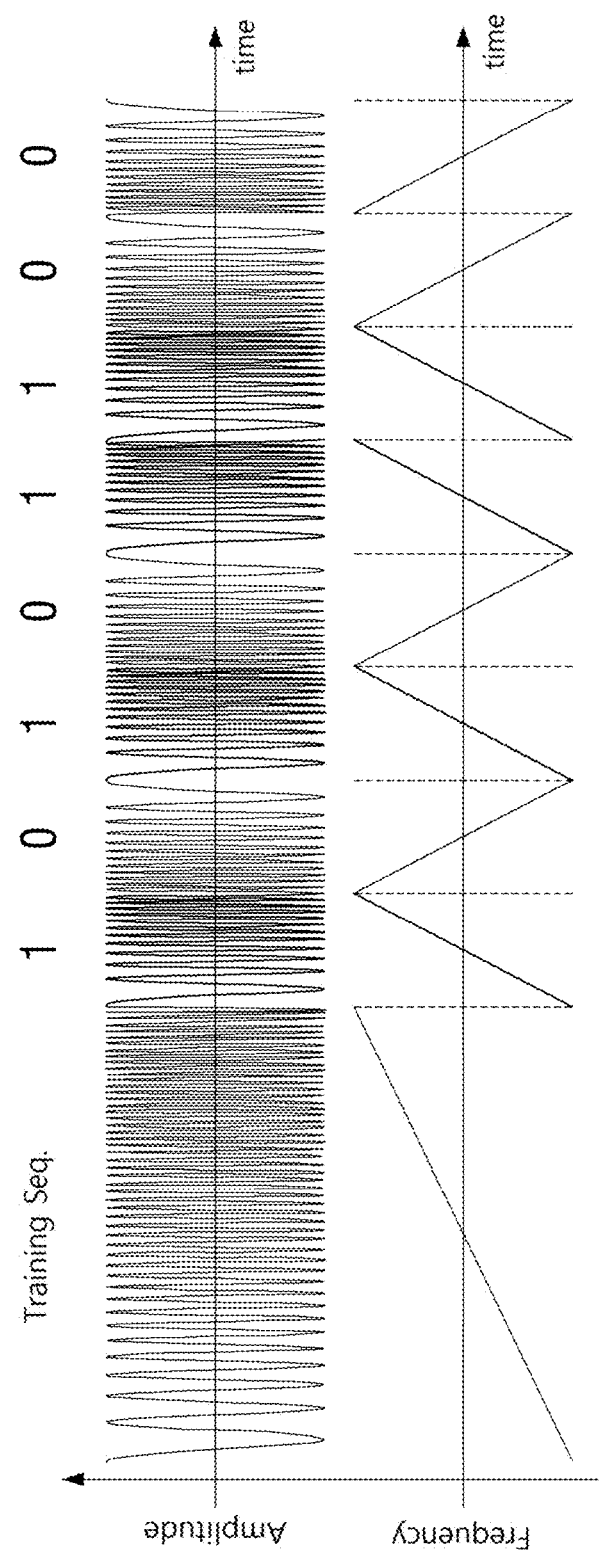
FIG. 3 is a view to explain waveform data in a digital form including a training sequence.

FIG. 3 is a view to explain waveform data which includes a training sequence.

Referring to FIG. 3, the training sequence included in the waveform data includes a symbol the frequency of which changes with time (hereinafter, a training sequence symbol).

The training sequence included in the waveform data in the digital form according to an exemplary embodiment of the present disclosure includes digital data (or a training sequence digital code) having the feature that the frequency changes with time.

The training sequence included in the waveform data in the analogue form according to an exemplary embodiment of the present disclosure includes an analogue signal having the feature that the frequency changes with time.

The training sequence recited in this specification refers to any one of a training sequence which is included in the waveform data in the digital form, and a training sequence which is included in the waveform data in the analogue form, or both of them.

The length of the training sequence may be longer than that of the time-varying signal-based symbol which means 1 or 0. This is to detect a start point of sound waves more exactly at a receiving side since the auto correlation and cross correlation characteristics are improved in proportion to the length of the time-varying symbol. The excellent correlation characteristic will be explained below with reference to FIG. 12.

The training sequence may be included in the first part or last part of the waveform data in the form of a preamble as shown in FIG. 3, or may be divided into sub-training sequences in the form of a pilot and included in the waveform data. In addition, considering an effect of a radio channel, a blank may be inserted between the training sequence and the time-varying signal indicating digital information, or a part of the training sequence may be repeatedly inserted, in the form of a cyclic prefix, into the waveform data.

Figure 21:
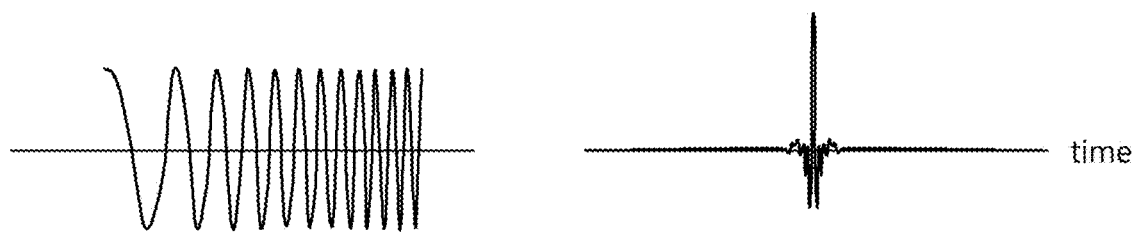
FIG. 21 is a view to explain a training sequence which is formed of two or more time-varying signals according to an exemplary embodiment of the present disclosure.
Figure 21:
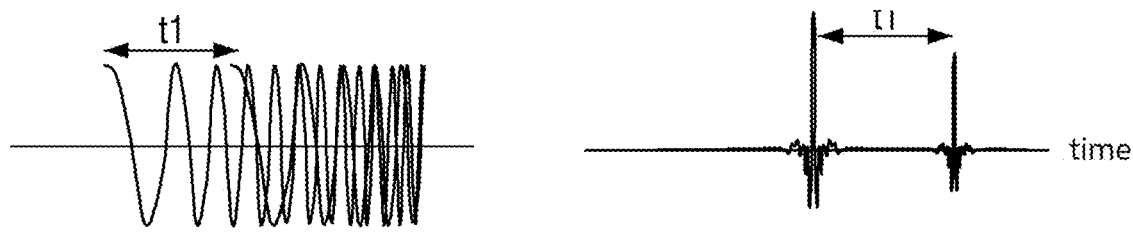

Referring to FIG. 21, the training sequence according to an exemplary embodiment of the present disclosure includes two or more time-varying signals. The training sequence including the two or more time-varying signals may provide information regarding the training sequence and a structure of a time-varying signal following the training sequence.

For example, as shown in FIG. 21, a gap between time-varying signals following the training sequence when the training sequence includes two or more time-varying signals may be shorter than a gap between time-varying signals (not shown) following the training sequence when the training sequence includes one time-varying signal.

In addition, when the training sequence includes two time-varying signals, the two time-varying signals may be distanced from each other by a predetermined time. Herein, the time interval (for example, t1 of view (b) of FIG. 21) may indicate the gap between the time-varying signals following the training sequence. The frequency of each of the time-varying up signal and the time-varying down signal changes with time. For example, the frequency of the time-varying up signal may linearly increase and the frequency of the time-varying down signal may linearly decrease. In another example, the frequency of the time-varying up signal may non-linearly change and the frequency of the time-varying down signal may non-linearly change, but the two signals show excellent auto correlation and cross correlation characteristics. The excellent correlation characteristic will be explained below with reference to FIG. 12.

In addition, the above-described time-varying up signal and time-varying down signal may change with time within a sound wave band (for example, 20 Hz to 24 kHz).

In step S103, the waveform data in the digital form stored in step S101 is converted into the analogue signal.

In step S103, the waveform data in the digital form is converted into the analogue signal at a predetermined sampling rate and at a predetermined quantization level.

For example, the predetermined sampling rate may be any one of 44.1 kHz, 48 kHz, 88.2 kHz, 96 kHz, and 192 kHz, and the predetermined quantization level may be any one of 8 bits, 16 bits, 20 bits, 24 bits, and 32 bits. These numerical values are merely an example, and thus it will be understood by an ordinary person skilled in the art that the present disclosure is not limited to these numerical values.

In step S105, the analogue signal converted in step S103 is outputted as sound waves. For example, step S105 may include a step of amplifying the analogue signal converted in step S103, and a step of outputting the amplified analogue signal through a speaker.

The sound wave transmitting method according to an exemplary embodiment of the present disclosure may continuously repeat the operations of amplifying the analogue signal converted from the waveform data in the digital form, and outputting the signal as the sound waves through the speaker (for example, after steps S101, S103, and S105 are performed, steps S103 and S105 are performed again, and then steps S103 and S105 are performed again, . . . so on). In this case, a receiving side which desires to receive the corresponding sound waves may receive the sound waves at a predetermined time without separately requesting transmission. In addition, the receiving side receives the repeatedly outputted sound waves and then demodulates by combining the sound waves, so that receiving performance can be enhanced.

The sound wave transmitting method according to an exemplar embodiment as described above with reference to FIGS. 1 to 3 may be applied to a sound wave system which reproduces certain data including digital bit data and outputs the data through a speaker, for example.

Figure 4:
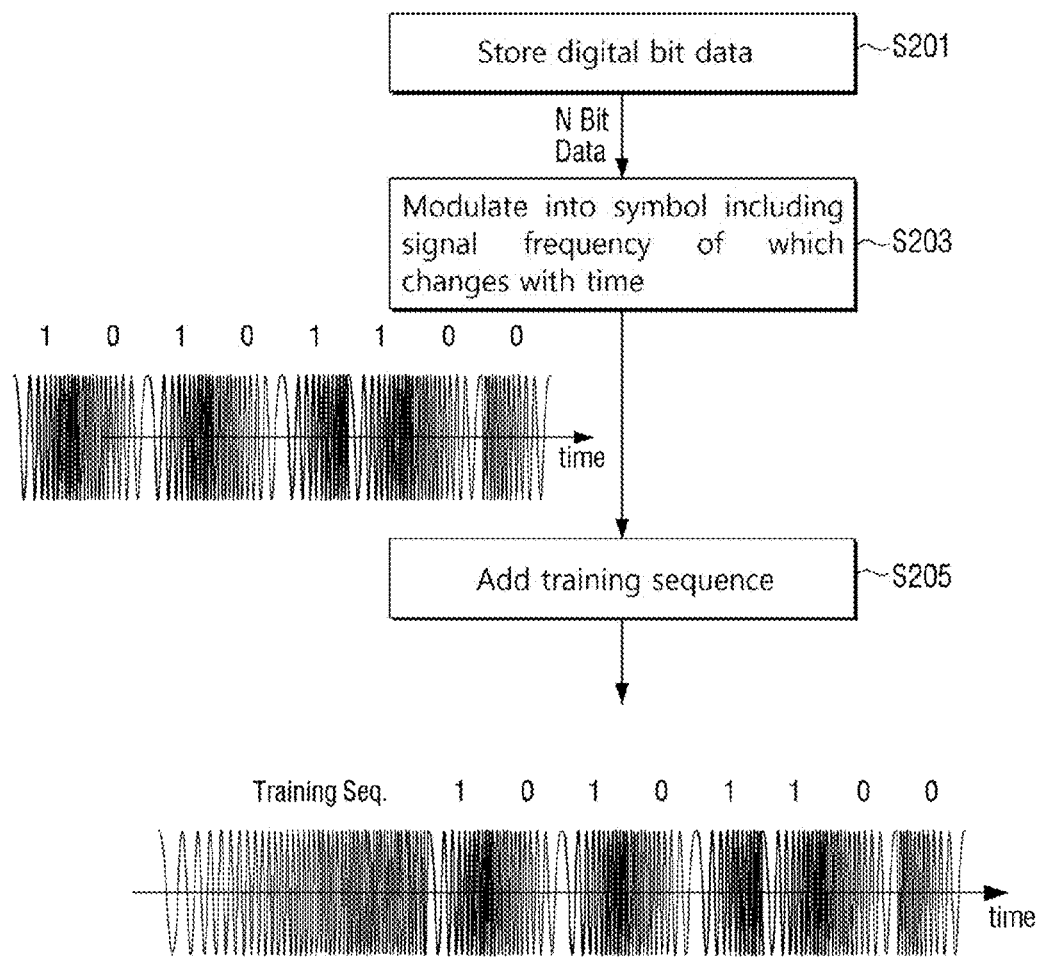
FIG. 4 is a view to explain a method for generating waveform data in a digital form according to an exemplary embodiment of the present disclosure.

FIG. 4 is a view to explain a method for generating waveform data in a digital form according to an exemplary embodiment of the present disclosure.

Referring to FIG. 4, the method for generating the waveform data in the digital form according to an exemplary embodiment of the present disclosure may include the steps of: storing digital bit data to be transmitted as sound waves, which is formed of "1" and "0" (S201); modulating the digital bit data stored in step S201 into symbols which are based on the signals the frequency of which changes with time within a sound wave band (S203); and adding a training sequence to the data modulated in the modulation step (S205).

In step S201, the digital bit data is stored.

In step S201, a computer-readable medium (a RAM, a hard disk, a ROM, a CD, a magnetic tape, etc.) may store the digital bit data. For example, the digital bit data may be a digital code like 10101100.

The digital bit data may further include an error detection or correction code for detecting or correcting an error.

In step S203, the digital bit data is modulated into the signal based symbols the frequency of which changes with time.

For example, in step S203, the digital bit data may be modulated into a first digital code and a second digital code. Herein, the first digital code and the second digital code may be digital data which has the feature that the frequency changes with time.

For example, the first digital code is a code which has the feature that the frequency increases with time, and the second digital code is a code which has the feature that the frequency decreases with time.

For example, a sampling rate of the first digital code and the second digital code may be any one of 44.1 kHz, 48 kHz, 88.2 kHz, 96 kHz, and 192 kHz, and a quantization level of the first digital code and the second digital code may be any one of 8 bits, 16 bits, 20 bits, 24 bits, and 32 bits. These numerical values are merely an example, and thus it will be understood by an ordinary person skilled in the art that the present disclosure is not limited to these numerical values.

For example, when it is assumed that the first digital code is "01010011" and the second digital code is "10001001" for the sake of easy understanding, the digital code 10101100 stored in step S201 may be modulated as follows (the part modulated into the first digital code is displayed in bold type for the sake of easy understanding):
01010011100010010101001110001001010100110101 00111000100110001001

These numerical values are merely an example, and thus it will be understood by an ordinary person skilled in the art that the present disclosure is not limited to these numerical values.

In step S205, the training sequence is added to the result of performing step S203. The training sequence may be longer than the symbol (for example, the first digital code or the second digital code) of the original bit data to be transmitted as shown in FIG. 4.

In addition, the training sequence may also include a digital code (training sequence digital code) which has the feature that the frequency changes with time.

When it is assumed that the result of performing step S203 is
01010011100010010101001110001001010100110101001 11000100110001001, and the training sequence digital code is "1110100100101010," the result of performing step S205 is as follows:
11101001001010100101001110001001010100111000 10010100110101001110001001100001001

Herein, the digital codes are added not to overlap with each other along a time axis. However, using the auto correlation and cross correlation characteristics of the time-varying symbol used in the above-described method, the digital codes may be added to overlap with each other as long as the digital codes can be sufficiently demodulated at the receiving side. In this case, the total length of the whole digital codes is reduced. In addition, the gap between the time-varying symbols can be increased using the blank or the cyclic prefix in which some of the time-varying symbols are repeated. In this case, the total length of the whole digital codes increases, but an interference effect caused by a multipath can be reduced. The excellent correlation characteristic will be explained below with reference to FIG. 12. The sound wave transmitting method according to an exemplary embodiment of the present disclosure as described above with reference to FIG. 4 may further include an error correction or detection encoding step (not shown) of adding an error correction or detection code to the digital bit data to be transmitted. Herein, the error correction or detection encoding step may be performed before step S201 or between steps S201 and 203. The waveform data in the digital form which is generated in the above-described method may be used in the sound wave transmitting method and apparatus explained in this specification.

For example, in the sound wave transmitting method described above with reference to FIGS. 1 to 3, the waveform data in the digital form stored in step S101 may be the result of performing step S205.

Figure 5:
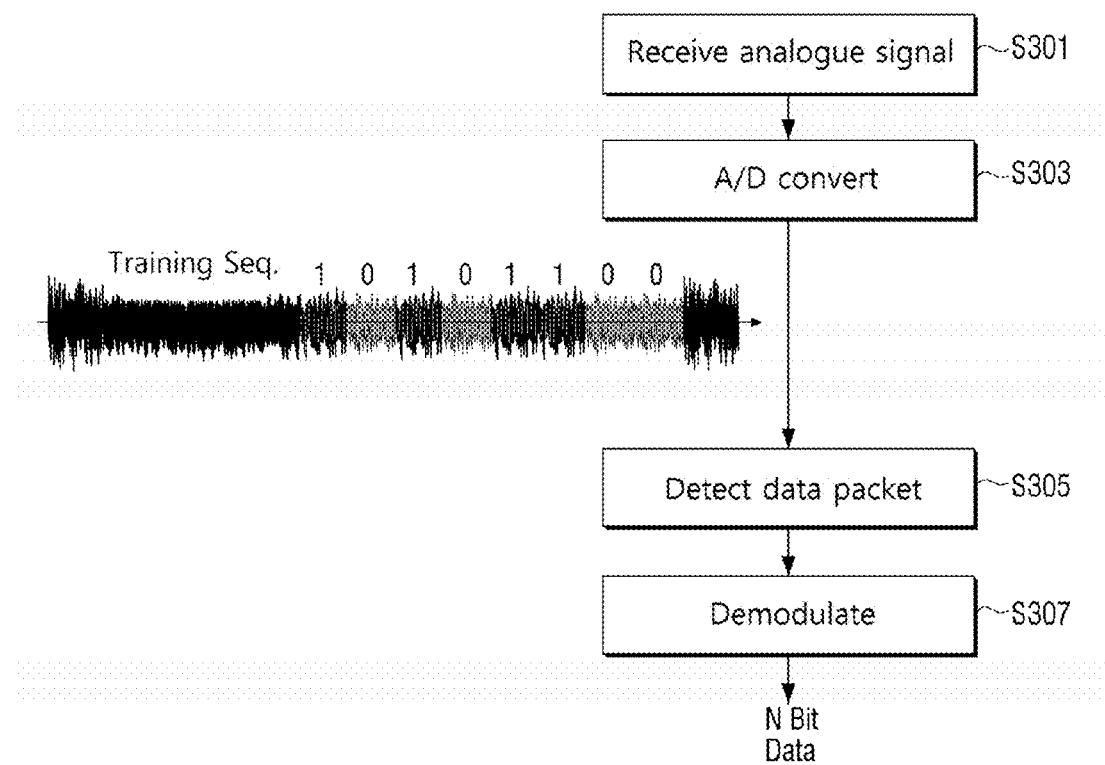
FIG. 5 is a view to explain a method for receiving sound waves according to an exemplary embodiment of the present disclosure.

FIG. 5 is a view to explain a method for receiving sound waves according to an exemplary embodiment of the present disclosure.

Referring to FIG. 5, the method for receiving sound waves (hereinafter, referred to as a "sound wave receiving method") according to an exemplary embodiment of the present disclosure may include: a step of receiving sound waves through a microphone and converting the sound waves into an analogue signal (S301); an A/D conversion step of converting the analogue signal into waveform data in a digital form (S303); a step of detecting a data packet from the waveform data in the digital form which is a result of performing the A/D conversion step (S305); and a step of demodulating the data packet into digital bit data (S307).

The sound waves received through the microphone in step S301 may include a time-varying up signal the frequency of which increases with time, and a time-varying down signal the frequency of which decreases with time, and the time-varying up signal and the time-varying down signal may change with time within a sound wave band.

For example, the signal received in step S301 may be the result of performing step S105 of FIG. 1.

In step S303, the analogue signal outputted through the microphone is converted into the waveform data in the digital form at a predetermined sampling rate and at a predetermined quantization level.

For example, the predetermined sampling rate may be any one of 44.1 kHz, 48 kHz, 88.2 kHz, 96 kHz, and 192 kHz, and the predetermined quantization level may be any one of 8 bits, 16 bits, 20 bits, 24 bits, and 32 bits.

In step S305, a part including original information to be received (referred to as a "packet" or "data packet") may be detected from the waveform data in the digital form converted in step S303.

Figure 10:
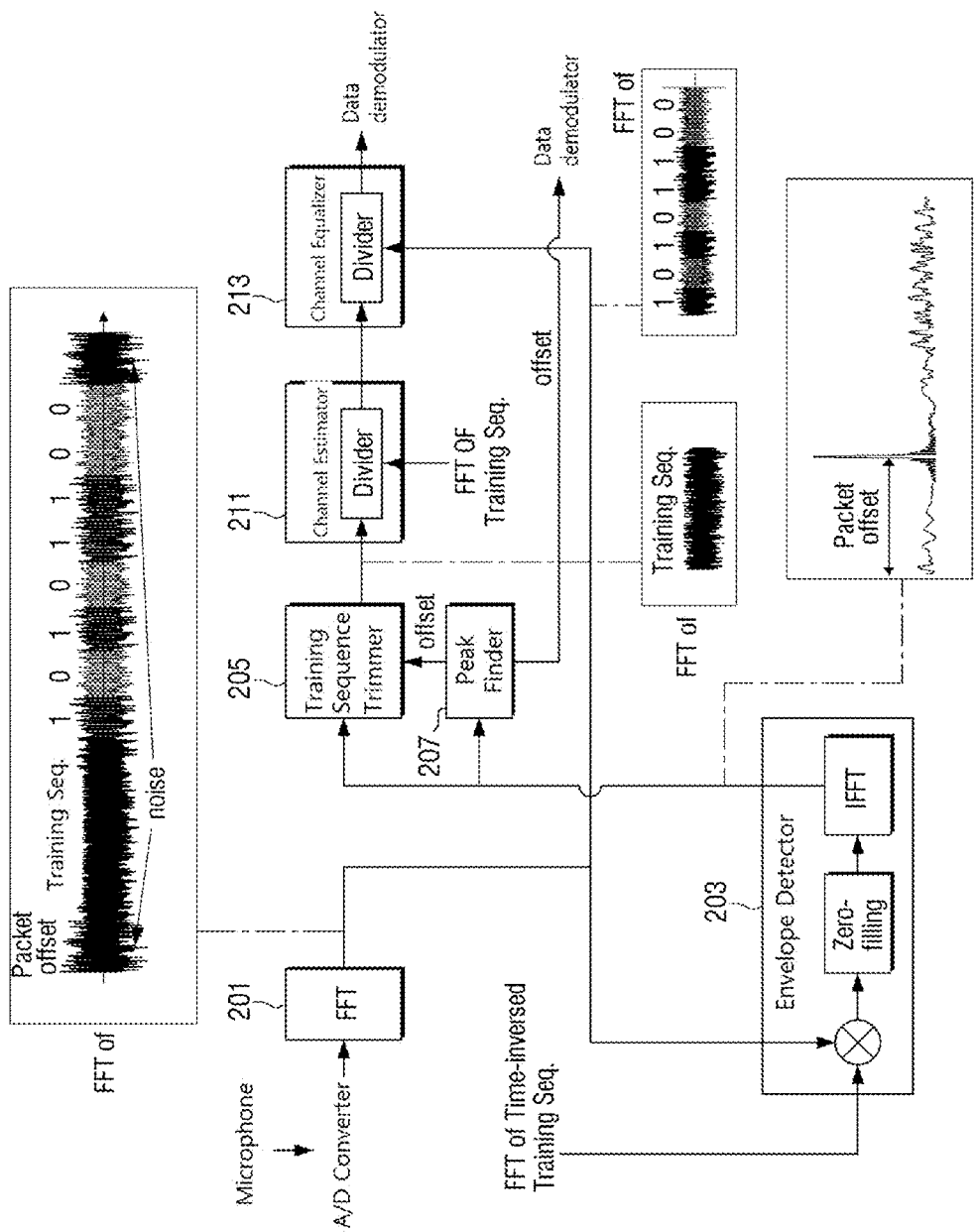

For example, in step S305, the waveform data in the digital form converted in step S303 undergoes Fast Fourier Transform (FFT) to be converted into a frequency domain first, and an envelope is detected from the signal converted by FFT and then a start point of the training sequence is found using the envelope. A packet starting from the found start point of the training sequence may be detected. In this specification, an exemplary embodiment in which step S305 is implemented as an apparatus will be explained below with reference to FIG. 10. Referring to FIG. 10, a training sequence separated by a training sequence trimmer 205 is illustrated.

Step S305 may further include a radio channel estimation operation and a channel equalization operation. That is, a channel effect may be estimated using the training sequence separated by the training sequence trimmer, and the channel effect may be removed from the waveform data in the digital form using the estimated channel effect.

In step S305, FFT of a time-inversed training sequence may be pre-stored and used for detecting the envelope.

That is, the signal obtained by performing FFT with respect to the digital data converted in step S303 is multiplied with a signal obtained by performing FFT with respect to the time-inversed training sequence, and then an operation called "zero-filling" in the technical field to which the present disclosure belongs, and an inverse FFT (IFFT) operation are performed continuously.

Figure 6:
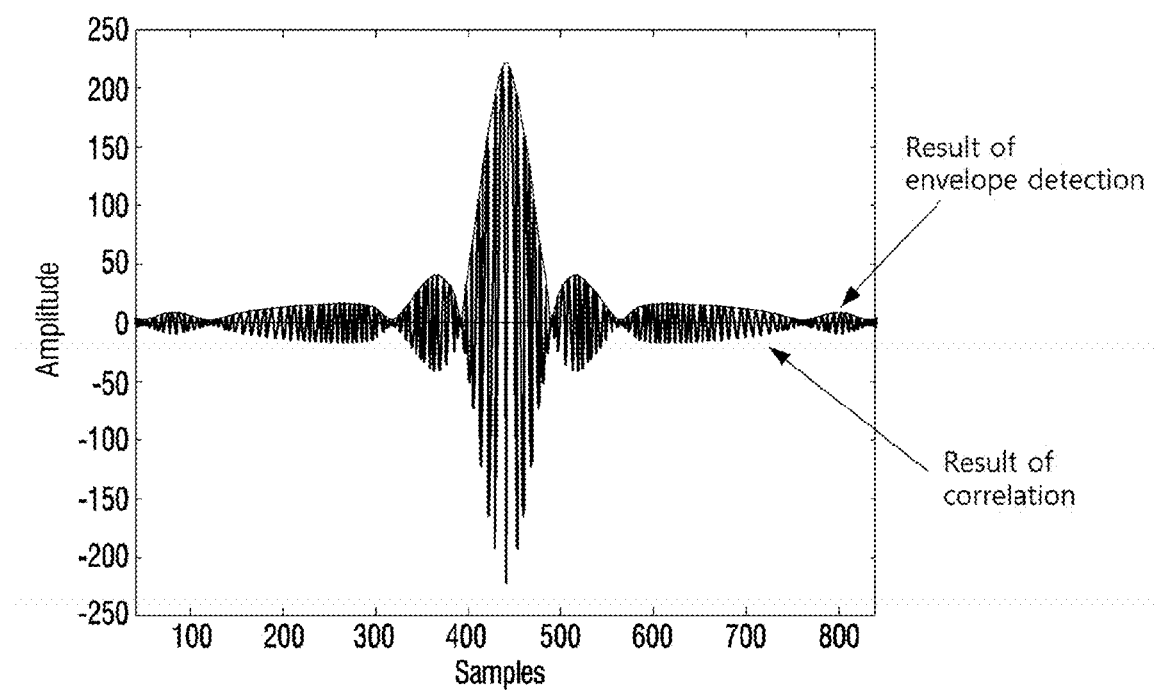
FIG. 6 is a view to explain zero-filling which is used in an exemplary embodiment of the present disclosure.

FIG. 6 is a view to explain zero-filling used in an exemplary embodiment of the present disclosure.

Referring to FIG. 6, the zero-filling operation is an operation of making the first half of the resultant signal of the FFT into zero, and is the same as filling a negative frequency part with zero.

By performing zero-filling, only the envelope part may be separated from the correlation result, and a maximum value part can be found more exactly in step S307.

In step S307, the packet detected in step S305 is demodulated into the digital bit data.

The packet detected in step S305 may be a packet from which the radio channel effect is removed through channel estimation and channel equalization.

In step S307, the operation of detecting the envelope may be performed two times with respect to the packet detected in step S305 as follows:

The first operation of detecting the envelope (hereinafter, referred to as a "first envelope detection operation") is an operation of detecting the envelope by multiplying the packet detected in step S305 with an FFT signal of a time-inversed up signal.

The second operation of detecting the envelope is an operation of detecting the envelope by multiplying the packet detected in step S305 with an FFF signal of a time-inversed down signal (hereinafter, referred to as a "second envelope detection operation").

Any one of the two envelope detection operations may be performed first or the two operations may be performed simultaneously.

In step S307, a bit detection operation is performed with respect to the result of performing the first envelope detection operation and the result of performing the second envelope detection operation.

The bit detection operation may be performed by a sampler and a comparer with reference to a distance value between the time-varying signal symbols already known to a receiving device and the given envelope, the start point of the training sequence in the digital waveform data known through the packet detection, and the length of the training sequence. Herein, the sampler estimates the start point of each of the time-varying signal symbols, and the comparer compares values (correlation values) at the start points of the time-varying signal symbols to determine a digital meaning of a time-varying signal having a higher value.

The digital bit data transmitted from a transmitting end is calculated at a receiving end through the operations of the sampler and the comparer based on the results of performing the first and second envelope detection operations. In this specification, an exemplary embodiment in which step S307 is implemented as an apparatus will be explained with reference to FIG. 11.

The sound wave receiving method according to an exemplary embodiment of the present disclosure as described above with reference to FIG. 5 may receive the sound waves including the same information (the sound waves including the same information may be referred to as copy sound waves for the sake of easy understanding) at least two times in sequence at predetermined time intervals (or randomly). For example, the sound wave receiving method may receive a first copy sound wave, and, after a predetermined time elapses, receive a second copy sound wave. After a predetermined time elapses, the sound wave receiving method may receive a third copy sound wave. In this example, the copy sound waves are received three times. However, this is merely an example and the copy sound waves may be received four or more times.

These copy sound waves may include the same information, but noises included in the copy sound waves and a distortion phenomenon of a channel influencing the copy sound waves may be different. Accordingly, all of the copy sound waves are demodulated in order to improve accuracy of demodulation, but all of the copy sound waves are considered for the detection operation, so that the possibility of receiving can be increased.

When the copy sound waves are continuously and repeatedly transmitted, various copy packets having the same contents but including different noises are received and applied to the copies until the bit detection step. In this case, the bit detection step is performed by combining the signal obtained from each of the copies before the bit detection step and information on the signal, so that the possibility of receiving can be increased.

The copy sound waves may include the same information, but noises included in the copy sound waves and a distortion phenomenon of a channel influencing the copy sound waves may be different. Accordingly, all of the copy sound waves are demodulated in order to improve accuracy of demodulation, but all of the copy sound waves are considered for the detection operation, so that the accuracy of detection can be enhanced. This will be explained in detail below with reference to FIG. 11.

When the digital bit data demodulated in step S307 includes an error correction or detection code, the sound wave receiving method according to an exemplary embodiment of the present disclosure as described above with reference to FIG. 5 may further include an error correction step or an error detection step (not shown) of detecting and correcting an error using error correction coding or error detection coding.

Herein, the error correction step may correct an error of the digital bit data demodulated in step S307 using an error correction code included in the digital bit data demodulated in step S307.

Herein, the error detection step may examine whether an error is included in the digital bit data demodulated in step S307 using an error detection code included in the digital bit data demodulated in step S307.

In the exemplary embodiment described above with reference to FIG. 5, the sampling rate may be any one of 44.1 kHz, 48 kHz, 88.2 kHz, 96 kHz, and 192 kHz, and the quantization level may be any one of 8 bits, 16 bits, 20 bits, 24 bits, and 32 bits. It will be understood by an ordinary person skilled in the art that these numerical values are merely an example.

Figure 7:
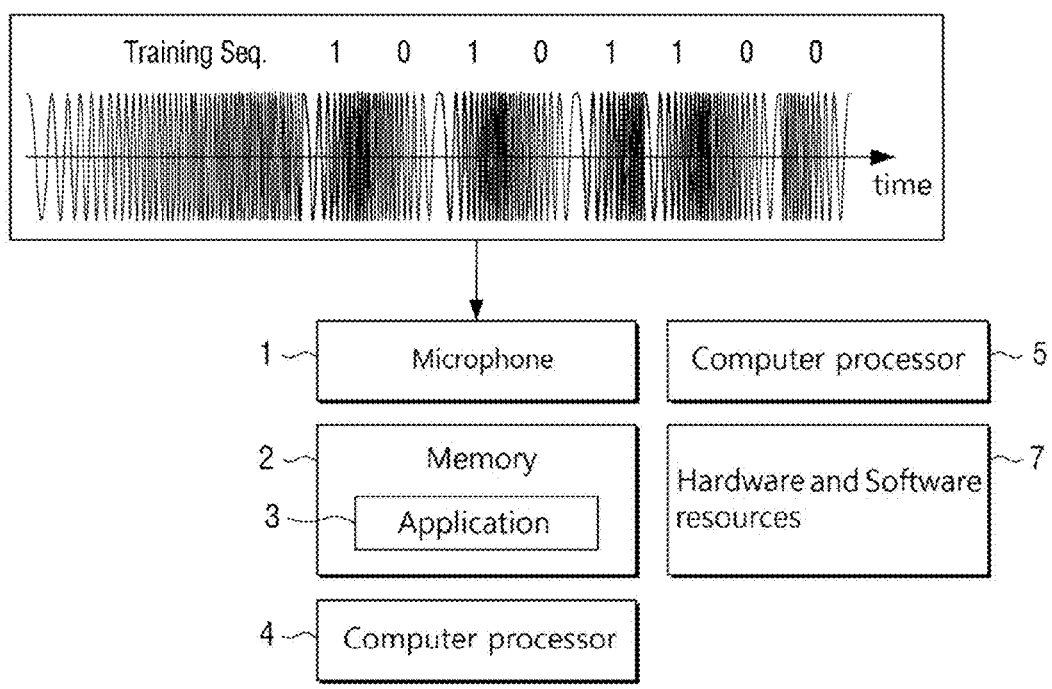
FIG. 7 is a view to explain an application according to an exemplary embodiment of the present disclosure.

FIG. 7 is a view to explain an application according to an exemplary embodiment of the present disclosure.

Referring to FIG. 7, a configuration of a computer in which an application according to an exemplary embodiment of the present disclosure is operated is illustrated by way of an example. Herein, the "computer" may be a device such as a smart phone, a tablet PC, a wearable computer, or a desktop PC.

Referring to FIG. 7, the computer may include a microphone 1 to receive sound waves, a memory 2 in which an application 3 is stored and executed, a computer processor 4 to load the application into the memory and execute the application, an A/D converter 5, and other hardware and software resources 7 necessary to operate the computer.

Herein, the application 3 may be a program which is loaded into the memory 2 by the computer processor 4 and executed. Herein, the program may be formed of codes which are executed by the computer processor 4.

When the application 3 is loaded into the memory 2 by the computer processor 4, the application 3 may determine whether the microphone 1 is turned on or not.

When the microphone 1 is not turned on, the application 3 may turn on the microphone 1.

The microphone 1 converts the received sound waves into an electric signal in an analogue form. Herein, the electric signal in the analogue form may have a waveform explained above with reference to FIG. 2.

The A/D converter 5 converts the electric signal received by and outputted from the microphone 1 into waveform data in a digital form.

That is, the A/D converter 5 may convert the electric signal outputted from the microphone 5 into the waveform data in the digital form at a predetermined sampling rate and at a predetermined quantization level.

For example, the predetermined sampling rate may be any one of 44.1 kHz, 48 kHz, 88.2 kHz, 96 kHz, and 192 kHz, and the predetermined quantization level may be any one of 8 bits, 16 bits, 20 bits, 24 bits, and 32 bits.

The application 3 may convert the digital data converted by the A/D converter 5 into digital bit data by detecting a packet and demodulating.

The sound waves to be converted by the application 3 may include a time-varying up signal the frequency of which increases with time, and a time-varying down signal the frequency of which decreases with time. For example, the sound waves to be converted by the application 3 may be the signal outputted in step S105 described above.

In addition, the sound waves to be converted by the application 3 may be the sound waves which are continuously and repeatedly transmitted as described above with reference to FIGS. 1 to 3.

Figure 9:
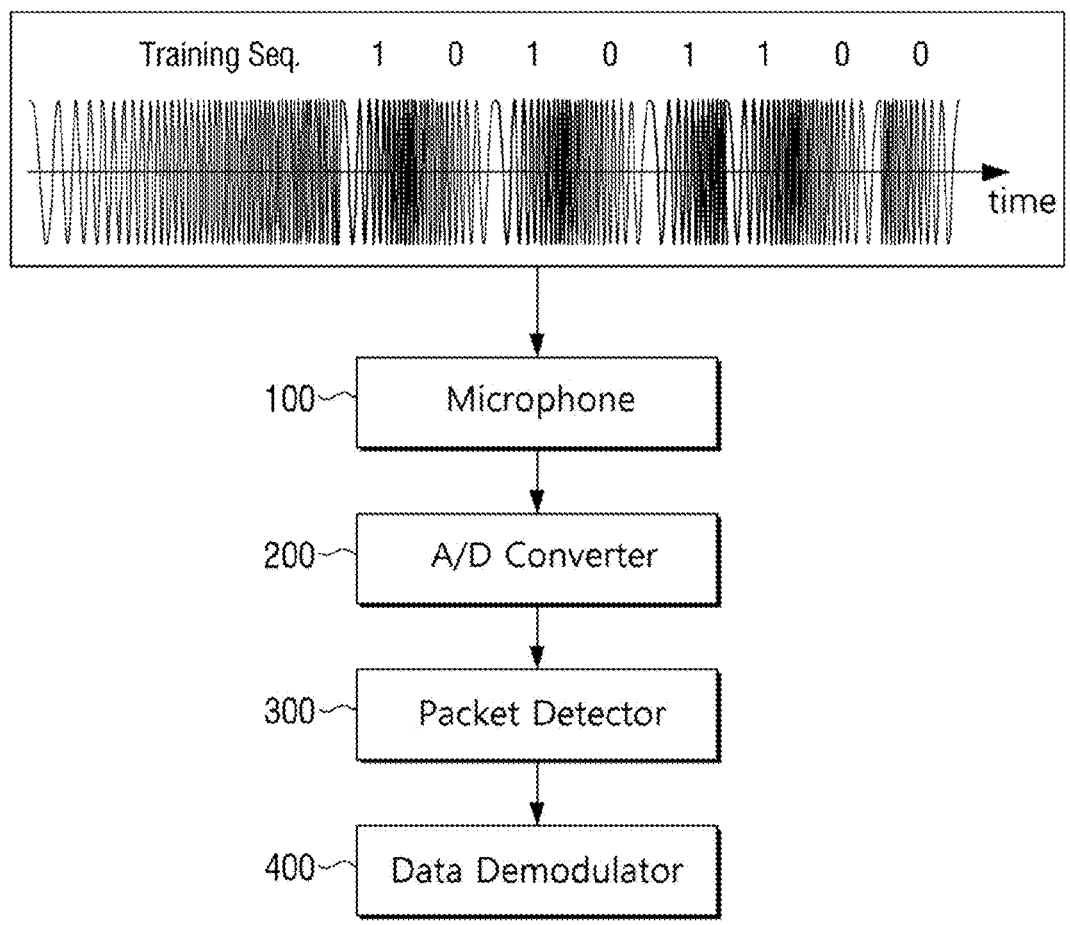
FIGS. 9 to 11 are views to explain an apparatus for receiving sound waves according to an exemplary embodiment of the present disclosure.

Herein, the packet detection operation is the same as the operation of a picketer detector 300 of FIG. 9, and the demodulation operation is the same as the operation of a demodulator 400 of FIG. 9.

For example, the application 3 may use a training sequence when performing the packet detection operation, and the training sequence used in the exemplary embodiments may include a time-varying up signal or a time-varying down signal.

Specifically, the application 3 detects the packet using an FFT value of the time-varying up signal or the time-varying down signal. For example, the application 3 converts the digital data converted by the A/D converter 5 through FFT, and detects an envelope of the FFT-converted signal. In this case, the application 3 may use an FFT value of a time-inversed training sequence.

In addition, the application 3 may perform channel estimation and channel equalization, and may use the FFT value of the training sequence when performing channel estimation.

The packet detection operation of the application 3 will be explained in detail below with reference to the operation of the packet detector 300 of FIG. 9 and FIG. 10.

The application 3 may demodulate the detected packet into digital bit data. In this case, the application 3 may use a symbol according to an exemplary embodiment of the present disclosure. For example, the symbol used for the demodulation operation of the application 3 may be the time-varying up signal and the time-varying down signal.

Specifically, the application 3 may detect the packet using the FFT value of the time-varying up signal or the time-varying down signal. For example, when the envelope is detected, the FFT value of the time-varying up signal inversed on the time axis, and the FFT value of the time-varying down signal inversed on the time axis are used.

The demodulation operation of the application 3 will be explained in detail below with reference to the operation of the demodulator 900 of FIG. 9 and FIG. 11.

As described above, the operation of the application 3 converting the sound waves into the digital bit data may include steps S305 and 307 described above with reference to FIG. 5.

In addition, when copy sound waves are transmitted at least two times in sequence at predetermined time intervals (or randomly) as in the exemplary embodiment of the present disclosure described in FIGS. 1 to 3, the operation of the application 3 converting the sound waves into the digital bit data demodulates through the steps described with reference to FIG. 5.

These copy sound waves may include the same information, but noises included in the copy sound waves may be different. Accordingly, all of the copy sound waves are demodulated in order to improve accuracy of demodulation, but all of the copy sound waves are considered for the detection operation, so that the accuracy of detection can be enhanced. This will be explained in detail below with reference to FIGS. 11 and 18 which illustrate a sound wave receiving apparatus according to the present disclosure.

The application in the computer described above with reference to FIG. 7 may turn on the microphone. However, the application may be implemented differently.

For example, the computer of FIG. 7 may further include a low-power voice detection chip. In this configuration, even when the computer is in a standby state, the low-power voice detection chip may detect a sound wave pattern (i.e., a pattern indicating that there is a meaningful sound wave; this pattern may be included in the waveform data in the digital form). In this case, the computer turns on the microphone 1, converts the computer processor in the standby state into the activation state, and executes at least one predetermined application. Herein, the at least one application may be the above-described application 3 or may be an application necessary for executing the application 3 or allowing the application 3 to be executed.

The A/D converter 5 may convert the electric signal outputted from the microphone 1 into digital data and output the digital data, and the application 3 may convert the digital data outputted from the A/D converter 5 into digital bit data by detecting the packet and demodulating.

Figure 8:
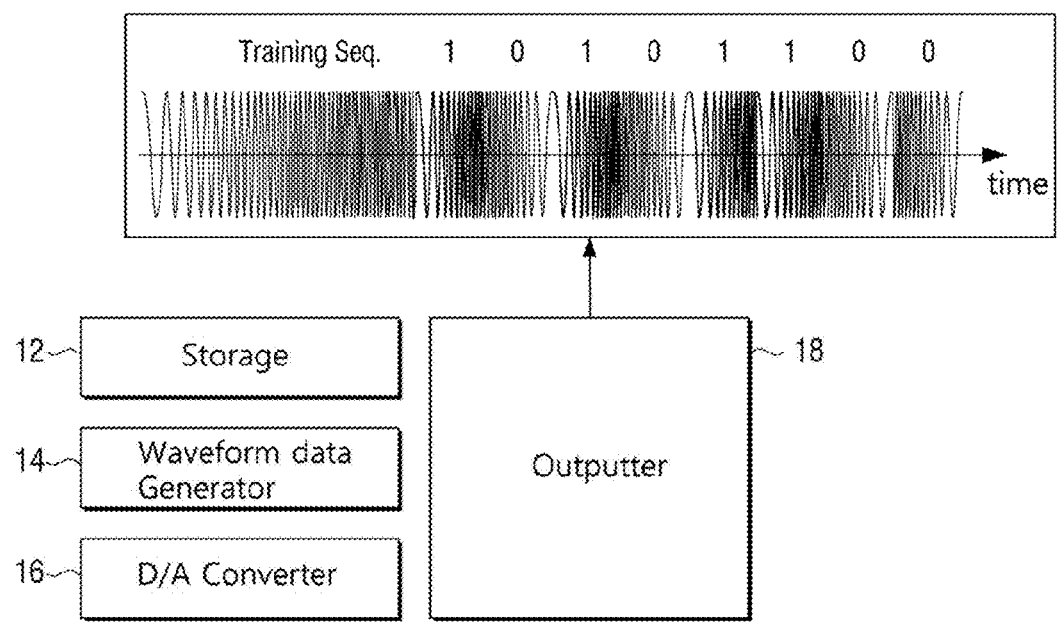
FIG. 8 is a view to explain an apparatus for transmitting sound waves using a time-varying frequency-based symbol according to an exemplary embodiment of the present disclosure.

FIG. 8 is a view to explain an apparatus for transmitting sound waves using a time-varying frequency-based symbol according to an exemplary embodiment of the present disclosure.

The apparatus for transmitting sound waves using the time-varying frequency-based symbol according to an exemplary embodiment (hereinafter, referred to as a "sound wave transmitting apparatus") as shown in FIG. 8 is an example of an apparatus which is implemented based on the sound wave transmitting method described above with reference to FIGS. 1 to 4.

Referring to FIG. 8, the sound wave transmitting apparatus includes a storage 12, a digital waveform data generator 14, a D/A converter 16 to convert the waveform data in the digital form into an analogue signal, and an outputter 18 to amplify and output the analogue signal as sound waves.

According to an exemplary embodiment, the storage 12 stores digital bit data to be transmitted as sound waves.

The storage 12 may additionally store the digital waveform data generated by the waveform data generator 14.

The storage 12 may temporarily store data like a RAM, or may be a storage device such as a flash RAM, a CD, a ROM, or an HDD.

In the present exemplary embodiment, a single storage 12 is illustrated for the purpose of explaining. However, a plurality of storages 12 including a first storage to store the digit bit data and a second storage to store the digital waveform data may be provided.

The digital waveform data generator 14 generates the digital bit data as waveform data in the digital form.

For example, the digital waveform data generator 14 may perform the digital waveform data generation operation described above with reference to FIG. 4 (refer to the explanation of FIG. 4).

Accordingly, the result of the operation of the digital waveform data generator 14 may be digital data which includes symbols based on a time-varying up signal and a time-varying down signal the frequency of which changes with time.

The D/A converter 16 converts the data generated by the waveform data generator 14 into an analogue signal.

For example, the D/A converter 16 may perform step S103 described above with reference to FIG. 1.

The outputter 18 for amplifying and outputting the analogue signal as sound waves may amplify the analogue signal generated by the D/A converter 16 and output the analogue signal.

For example, the outputter 18 may include an amplifier (not shown) to amplify the analogue signal, and a speaker (not shown) to output the signal amplified by the amplifier in the form of sound waves.

The sound wave transmitting apparatus according to an exemplary embodiment of the present disclosure as described above with reference to FIG. 8 may further include an error correction or detection encoder (not shown) to add an error correction or detection code to the digital bit data to be transmitted.

Herein, the error correction or detection encoder (not shown) performs an error correction or detection encoding operation with respect to the digital bit data stored in the storage 12, and adds the error correction or error detection code to the digital bit data to be inputted to the waveform data generator 14.

In addition, the sound wave transmitting apparatus according to an exemplary embodiment of the present disclosure as described above with reference to FIG. 8 may continuously repeat the operation of amplifying the analogue signal converted from the digital waveform data and outputting the signal as sound waves through the speaker. In this case, a receiving side which desires to receive the corresponding sound waves may receive the sound waves at a predetermined time without separately requesting transmission. In addition, the receiving side receives the sound waves repeatedly outputted and then demodulate by combining the sound waves, so that receiving performance can be enhanced.

Figure 11:
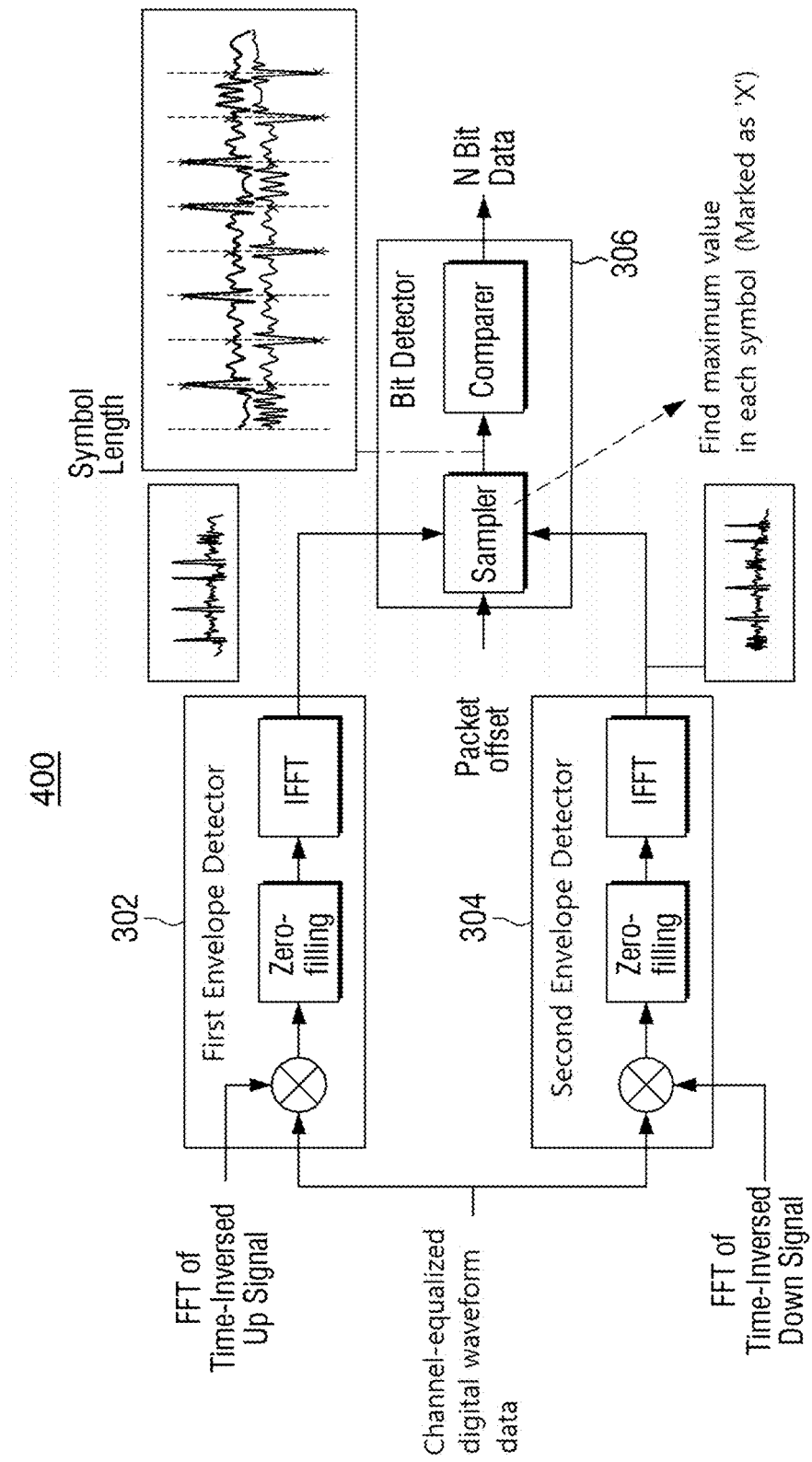

FIGS. 9 to 11 are views to explain a sound wave receiving apparatus according to an exemplary embodiment of the present disclosure.

Referring to the drawings, the sound wave receiving apparatus according to an exemplary embodiment of the present disclosure may include a microphone 100, an A/D converter 200, a packet detector 300, and a data demodulator 400. Herein, the sound wave receiving apparatus may be a device such as a smart phone, a tablet PC, a wearable computer, a desktop PC, a server, or a PDA.

The microphone 100 receives sound waves and converts the sound waves into an electric signal in an analogue form. Herein, the electric signal in the analogue form may include a waveform having the frequency characteristic shown in FIG. 2.

For example, the microphone 100 may perform step S301 of FIG. 5.

The electric signal outputted by the microphone 100 includes a time-varying up signal and a time-varying down signal the frequency of which changes with time.

The A/D converter 200 converts the electric signal outputted by the microphone 100 into waveform data in the digital form, and outputs the digital waveform data. For example, the A/D converter 200 may convert the electric signal outputted by the microphone 100 into the digital waveform data at a predetermined sampling rate and at a predetermined quantization level.

For example, the predetermined sampling rate may be any one of 44.1 kHz, 48 kHz, 88.2 kHz, 96 kHz, and 192 kHz, and the predetermined quantization level may be any one of 8 bits, 16 bits, 20 bits, 24 bits, and 32 bits.

The packet detector 300 may detect a part including original information to receive (that is, a packet or packet data) from the digital data outputted from the A/D converter 200.

For example, the packet detector 300 may perform step S305 of FIG. 5.

The data demodulator 400 demodulates the packet detected by the packet detector 300 into digital bit data.

For example, the data demodulator 400 may perform step S307 of FIG. 5.

Referring to FIG. 10, the configuration and operation of the packet detector 300 will be explained in detail.

For example, the packet detector 300 may include an FFT unit 201 to perform FFT to convert the digital data outputted by the A/D converter 200 into a frequency domain, an envelope detector 203 to detect an envelope regarding the signal converted by the FFT unit 201, a peak finder 207 to find a location of a training sequence, and a training sequence trimmer, a channel estimator 211, and a channel equalizer 213 to separate the training sequence from the signal converted by the FFT unit 201.

The envelope detector 203 may include a multiplier which receives the signal converted by the FFT unit 210 and an FFT value of a time-inversed training sequence, and multiplies both values (that is, correlation), a zero filling unit to perform zero-filling with respect to the result of the multiplier, and an IFFT unit to perform IFFT with respect to the result of zero-filling.

Since the zero-filling operation and the result thereof have been described above with reference to FIG. 6, an explanation thereof is omitted here.

The data outputted from the envelope detector 203 is a value which is converted into a time domain by the IFFT unit, and the peak finder 207 determines the location of the training sequence using this value. Offset in FIG. 10 means a time at which the packet of the whole reception signals starts.

The peak finder 207 functions to find a maximum value from a given signal, and may be implemented by using a method for simply finding a maximum value or various heuristic methods for finding offset of a packet using a characteristic of a signal. For example, since a maximum value which is a result of correlation shows a bilateral symmetry characteristic when there is no noise and channel distortion, the peak finder 207 may calculate more exact offset than offset calculated based on a simple maximum value with reference to the degree of bilateral symmetry after and before the maximum value is found.

The training sequence trimmer 205 receives the signal converted into the time domain by the IFFT unit of the envelope detector, and separates the training sequence from the signal using the location of the training sequence found by the peak finder 207 and an already known length value of the training sequence. In addition, the separated training sequence is provided to the channel estimator 211.

The channel estimator 211 estimates a channel effect from the training sequence provided from the training sequence trimmer 205. To achieve this, the channel estimator 211 may include a divider, for example.

The channel equalizer 213 receives data converted by the FFT unit 201, removes the channel effect provided from the channel estimator 211 from the corresponding signal (that is, corrects the distortion of the channel), and outputs the data to the data demodulator 400.

The packet detector 300 described above with reference to FIG. 10 may use the training sequence, and in particular, the training sequence used in the present exemplary embodiment includes a time-varying up signal or a time-varying down signal.

Specifically, the packet detector 300 detects the packet using the FFT value of the time-varying up signal or time-varying down signal. For example, the FFT value of the time-inversed training sequence may be used when the envelope is detected, and the FFT value of the training sequence is used when the channel is estimated.

Referring to FIG. 11, the configuration and operation of the data demodulator 400 will be explained in detail.

The data demodulator 400 may include a first envelope detector 302, a second envelope detector 304, and a bit detector 306.

The first envelope detector 302 and the second envelope detector 304 may receive output of the channel equalizer 213.

The first envelope detector 302 includes a multiplier which multiplies the FFT value of the time-inversed up signal and the value inputted by the channel equalizer 213, a zero filling unit to perform zero-filling with respect to the result of the multiplier, and an IFFT unit to perform IFFT with respect to the result of the zero-filling unit.

The second envelope detector 304 includes a multiplier which multiplies the FFT value of the time-inversed up signal and the value inputted by the channel equalizer 213, a zero filling unit to perform zero-filling with respect to the result of the multiplier, and an IFFT unit to perform IFFT with respect to the result of the zero-filling unit.

The bit detector 306 receives output values of the first envelope detector 302 and the second envelope detector 304, and calculates the digital bit data by sampling and comparing the values.

For example, the bit detector 306 may include a sampler (not shown) to estimate a start point of each of the time-varying signal symbols using the length of the training sequence known to the receiving end and a distance value between the time-varying signal symbols, offset given by the peak finder 207, and the envelope detected by the detectors 302, 304, and a comparer (not shown) to determine a digital meaning of a time-varying signal having a higher value by comparing values (correlation values) at the start points of the time-varying signal symbols.

The data demodulator 400 described above with reference to FIG. 11 may use the symbol according to an exemplary embodiment of the present disclosure. For example, the symbol used in the data demodulator 400 may be a time-varying up signal and a time-varying down signal.

Specifically, the data demodulator 400 may detect the packet using the FFT value of the time-varying up signal or the time-varying down signal. For example, when the envelope is detected, the FFT value of the time-varying up signal inversed on the time axis and the FFT value of the time-varying down signal inversed on the time axis are used.

When an error correction or detection code is included in the digital bit data demodulated by the data demodulator 400, the sound wave receiving apparatus according to an exemplary embodiment of the present disclosure as described above with reference to FIGS. 8 to 11 may further include an error correction unit (not shown) to correct an error using error correction coding or error detection code, or an error detector (not shown) to detect an error. Herein, the error correction unit (not shown) may correct an error in the digital bit data demodulated by the data demodulator 400 using an error correction code included in the digital bit data demodulated by the data demodulator 400. In addition, the error detector (not shown) may examine whether there is an error in the digital bit data demodulated by the data demodulator 400 using an error detection code included in the digital bit data demodulated by the data demodulator 400.

The sound wave receiving apparatus according to an exemplary embodiment of the present disclosure as described above with reference to FIGS. 8 to 11 may further include a low-power voice detection chip. In this configuration, even when the sound wave receiving apparatus is in a standby state, the low-power voice detection chip may detect a sound wave pattern (i.e., a pattern indicating that there is a meaningful sound wave; this pattern may be included in the waveform data in the digital form). In this case, the sound wave receiving apparatus turns on the microphone 100, and converts a computer processor in the standby state into the activation state to operate the A/D converter 200, the packet detector 300, and the data demodulator 400.

The sound wave receiving apparatus according to an exemplary embodiment of the present disclosure as described above with reference to FIGS. 8 to 11 may include a computer processor to control the overall operations of the above-described elements. In addition, the A/D converter 200, the packet detector 300, and/or the data demodulator 400 may be implemented as software and/or hardware, and may be controlled by the computer processor to operate.

In addition, the sound wave receiving apparatus according to an exemplary embodiment of the present disclosure as described above with reference to FIGS. 8 to 11 may receive two or more copy sound waves. Herein, the two or more copy sound waves may be received at predetermined time intervals (or randomly). In this case, the sound wave receiving apparatus performs the operations of the microphone 100, the A/D converter 200, and the packet detector 300 with respect to the copy sound waves as soon as the sound waves are received, as shown in FIG. 5.

For the sake of easy understanding, the sound wave receiving apparatus according to an exemplary embodiment will be explained with reference to FIG. 18 on the assumption that the copy sound waves are received three times in sequence. It will be understood by an ordinary person skilled in the art that the numerical value is merely an example and the copy sound waves may be receives three or more times.

Figure 18:
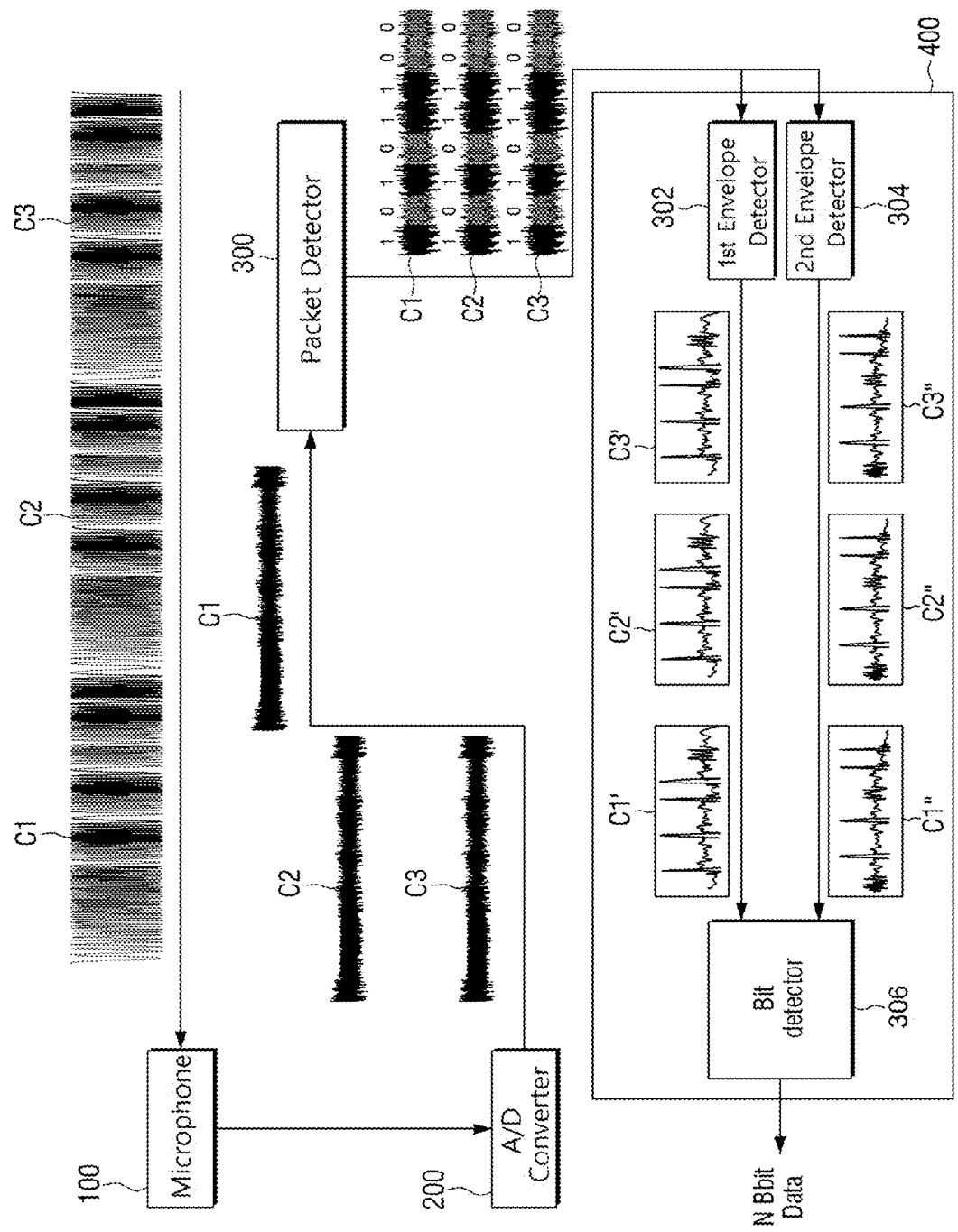
FIG. 18 is a view to explain a sound wave receiving apparatus which receives two or more copy sound waves according to an exemplary embodiment of the present disclosure.

FIG. 18 is a view to illustrate the sound wave receiving apparatus described above with reference to FIGS. 9 to 11 when copy sound waves are received.

Referring to FIG. 18, when the microphone 100 receives a first copy sound wave C1 at a time t1, the microphone 100 converts the first copy sound wave C1 into an electric signal C1 (hereinafter, a first electric signal). The A/D converter 200 converts the first electric signal C1 into waveform data in a digital form C1, and the packet detector 300 detects packet data C1 (hereinafter, first packet data) from the digital waveform data C1, and provides the packet data to the data demodulator 400.

When the microphone 100 receives a second copy sound wave C2 at a time t2 (herein, a gap between t1 and t2 may be appropriately determined by a person skilled in the art), packet data (second packet data) C2 may be detected by the A/D converter 200 and the packet detector 300 and may be provided to the data demodulator 400.

In addition, when the microphone 100 receives a third copy sound wave C3 at a time t3 (herein, a gap between t2 and t3 may be appropriately determined by a person skilled in the art), packet data (third packet data) C3 may be detected by the A/D converter 200 and the packet detector 300 and may be provided to the data demodulator 400.

The data demodulator 400 demodulates the digital bit data with reference to all of the first packet data C1, the second packet data C2, and the third packet data C3. For example, the first envelope detector 302 and the second envelope detector 304 of the data demodulator 400 may detect the envelope of the packet data and provide the envelope to the bit detector 306.

Referring to FIG. 18, the envelope detected from the first packet data C1 outputted from the packet detector 100 is expressed by C1' and C1", the envelope detected from the second packet data C2 is expressed by C2' and C2", and the envelope detected from the third packet data C3 is expressed by C3' and C3".

The bit detector 306 may determine a digital bit more exactly by considering all of the envelopes of the packet data. Therefore, the performance of the sound wave receiving apparatus is improved.

Referring to FIG. 18, the bit detector 306 finds a maximum point with reference to C1', C2', and C3' and finds a maximum point with reference to C1", C2", and C3", and then detects the bit by using the comparer.

The signs and graphs shown in FIG. 18 are illustrated for the sake of easy understanding, and it will be understood by a person skilled in the art that the present disclosure is not limited to these signs and graphs.

According to another exemplary embodiment of the present disclosure, the sound wave receiving apparatus may further include an adder (not shown) and a buffer (not shown).

According to the present exemplary embodiment, the adder (not shown) and the buffer (not shown) may be disposed between the A/D converter 200 and the packet detector 300 from the functional aspect, and the buffer (not shown) stores the waveform data in the digital form outputted from the A/D converter 200, and the adder (not shown) adds the digital waveform data stored in the buffer (not shown) and outputs the added data. A subsequent operation is performed by the packet detector 300 and the data demodulator 400.

Figure 17:
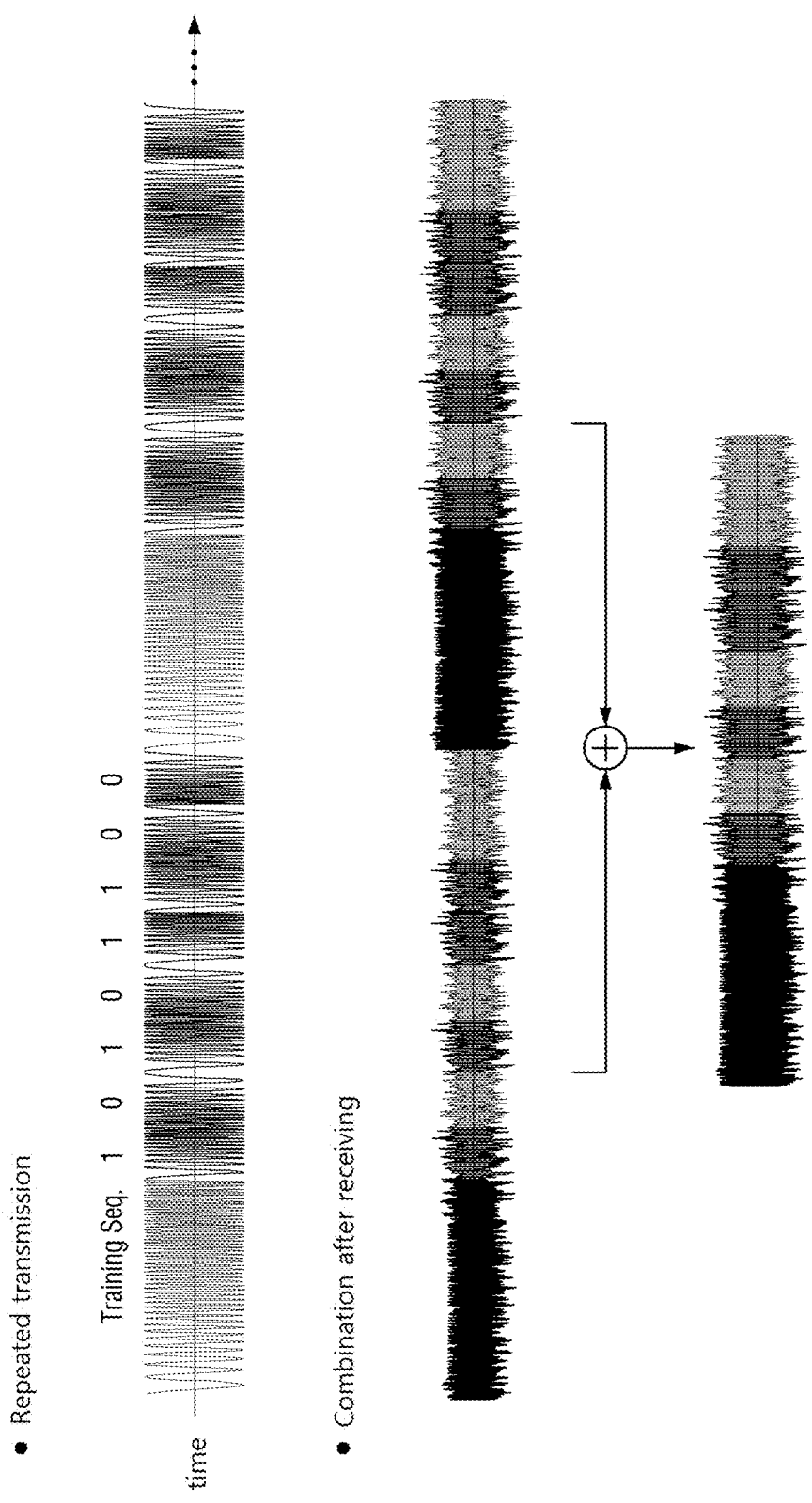
FIG. 17 is a view to explain repetitive transmission and reception according to an exemplary embodiment of the present disclosure.

FIG. 17 illustrates that the adder receives the waveform data in the digital form and performs addition. By performing addition as described above, the noise included in the copy sound waves may be offset, and thus the data demodulator 400 may detect more exactly.

In addition, according to another exemplary embodiment, the sound wave receiving apparatus may be applied to a case in which some of the two or more copy sound waves are received at predetermined time intervals (or randomly), and the others are received overlapping with each other on the time axis.

For example, the sound wave receiving apparatus according to the present disclosure may be applied to a case in which five copy sound waves are received, specifically, the first copy sound wave is received at a time t1, the second copy sound wave is received at a time t2, the second copy sound wave and the third copy sound wave are received at a time t3, the third copy sound wave and the fourth copy sound wave are received at a time t4, and the fifth copy sound wave is received at a time t5. FIG. 12 is a view to explain a correlation characteristic of a time-varying signal according to an exemplary embodiment of the present disclosure.

View (a) of FIG. 12 illustrates a graph showing an auto correlation characteristic and view (b) of FIG. 12 illustrates a graph showing a cross correlation characteristic of a time-varying up signal and a time-varying down signal used in the present disclosure. Herein, the auto correlation refers to a correlation between the time-varying up signal and the time-varying up signal or between the time-varying down signal and the time-varying down signal, and the cross correlation refers to a correlation between the time-varying down signal and the time-varying up signal.

As can be intuitively seen from the graphs, the time-varying up signal and the time-varying down signal used in the present disclosure show an excellent correlation characteristic, and are resistant to external noise or interference. That is, when the two signals are the same time-varying signal and are exactly consistent with each other on the time axis, a very sharp and high signal is generated. Therefore, it is beneficial to find a start point of the same signals and determine the presence/absence of a signal based on the correlation. In addition, when the two signals are different time-varying signals, a very low signal is generated even if they have any time difference. Therefore, it is beneficial not to detect an unfound signal based on the correlation. In addition, these time-varying up signal and time-varying down signal may be beneficial to measuring a distance between a transmitting end and a receiving end as well as transmitting and receiving information. Since the correlation characteristic is excellent, a signal receiving time can be calculated in a more precise unit, and a signal transmitting time (an absolute transmitting time or an absolute receiving time) can be exactly calculated based on the signal receiving time. In addition, a distance of a path through which signals are transmitted can be measured by multiplying the signal transmitting time with an advancing speed of sound waves.

In the above-described exemplary embodiments, the signal is generated such that the time-varying up signal, the time-varying down signal, and the training sequence do not overlap with one another on the time axis, and is transmitted and received. However, this is merely an example, and the signal is not necessarily generated such that the time-varying up signal, the time-varying down signal, and the training sequence do not overlap with one another on the time axis. The signal may be generated such that the time-varying up signal, the time-varying down signal, and the training sequence overlap with one another on the time axis, without departing from the range in which the receiving end can successfully demodulate based on the correlation.

Figure 19:
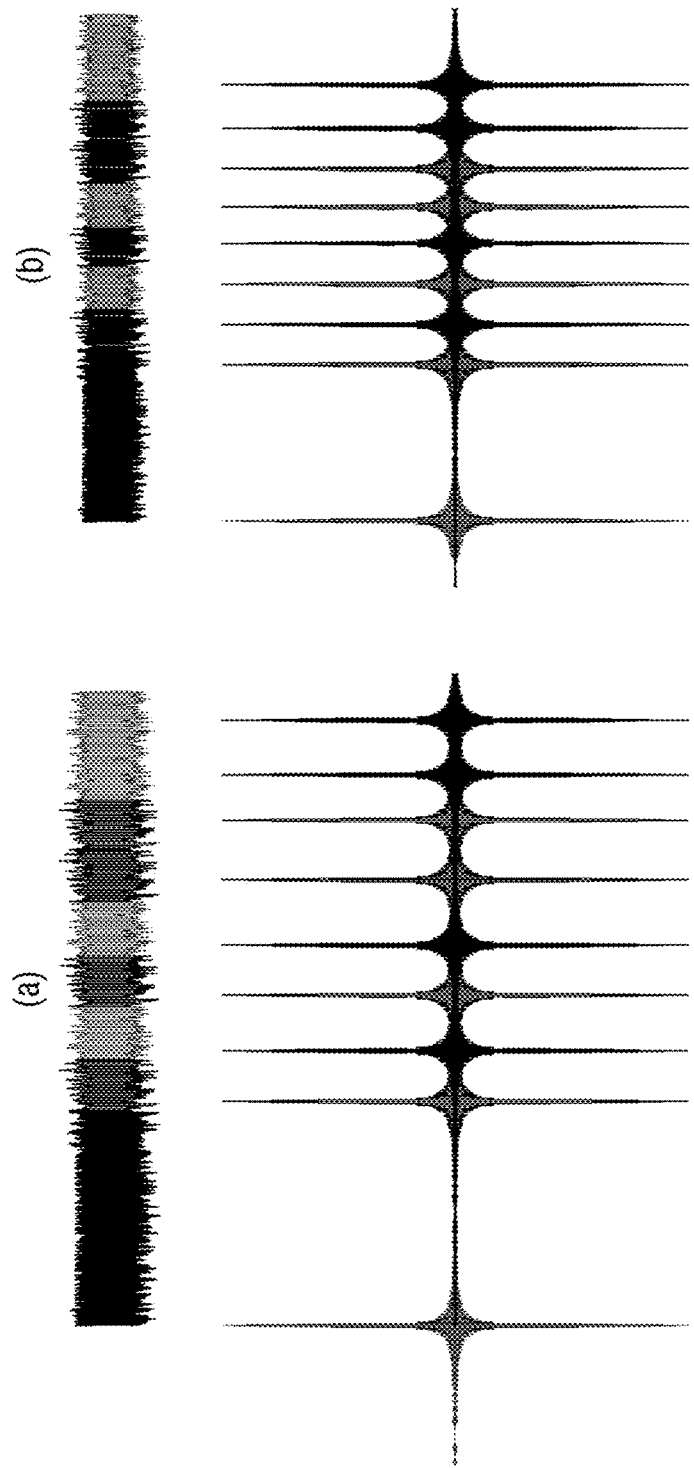
FIG. 19 is a view to explain reception when symbols are placed to overlap with each other on a time axis or are placed not to overlap with each other on the time axis.

View (a) of FIG. 19 illustrates a reception signal which combines resulting signals in which a high value appears by correlating waveform data generated not to have overlapping time-varying symbols with the training sequence, the time-varying up signal, and the time-varying down signal, and view (b) of FIG. 9 illustrates a reception signal which combines resulting signals in which a high value appears by correlating waveform data generated to have overlapping time-varying symbols with the training sequence, the time-varying up signal, and the time-varying down signal. As can be seen from FIG. 19, a gap between the high resulting values of the correlation is reduced when the time-varying symbols overlap with each other. This gap may reduce the gap between the time-varying symbols to the extent that the successful reception is not hindered. In this case, the number of symbols to be transmitted per unit time increases. In addition, more information can be carried by using the kinds of previous and next symbols and the gap therebetween (a phase from the frequency response aspect) by adjusting the gap between the time-varying symbols.

The above-described exemplary embodiments may be applied to the technical fields for estimating locations using sound waves. For example, the above-described exemplary embodiments may be utilized in Korean Patent Application No. 10-2012-0053286 (filed on May 18, 2012) relating to a system for identifying a speaker and a location estimation system using the same, or Korean Patent Application No. 10-2012-0038120 (filed on Apr. 14, 2012) relating to a method and system for estimating a location of a mobile terminal using a sound system, and a sound system using the same.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present disclosure.

What is claimed is:

1. A method for transmitting sound waves using a time-varying frequency-based symbol, the method comprising:
converting digital waveform data into an analogue signal;
amplifying, by an amplifier, the analogue signal; and
repeatedly outputting a predetermined number of times, by a speaker, the amplified analogue signal as sound waves in a sound wave band of 20 Hz to 24 kHz,
wherein the digital waveform data comprises a time-varying signal including a first digital code having a frequency which linearly or nonlinearly increases or decreases with time, and a second digital code having a frequency which linearly or nonlinearly decreases with time when the frequency of the first digital code increases with time, or linearly or nonlinearly increases with time when the frequency of the first digital code decreases with time;
wherein the digital waveform data further comprises a training sequence having at least one training sequence digital code, where each training sequence in the repeatedly outputted analogue signal is distanced from a preceding time-varying signal by a first time interval and from a succeeding time-varying signal by a second time interval; and
wherein, after a receiving apparatus receives the repeatedly output analogue signal the predetermined number of times, the receiving apparatus demodulates the received repeatedly output analogue signal.

2. The method of claim 1, wherein the receiving apparatus demodulates the received repeatedly output analogue signal by detecting the time-varying signal of each signal in the repeatedly output analogue signal and by detecting digital bit data based on all of the detected time-varying signals.

3. The method of claim 2, wherein the demodulation of the repeatedly output analogue signal is performed by detecting envelopes of the time-varying signal of each signal in the output analogue signal and by detecting the digital bit data using the detected envelopes of all of the detected time-varying signals.

4. A method for generating digital waveform data from digital bit data formed of "1" and "0," the method comprising:

modulating the digital bit data formed of "1" and "0" into a symbol having a characteristic that a frequency of the symbol changes with time within a sound wave band; and adding a training sequence to the modulated data, wherein digital waveform data generated by modulating the digital bit data and adding the training sequence is converted into an analogue signal, the analogue signal is amplified by an amplifier, and then the analogue signal is repeatedly outputted a predetermined number of times through a speaker as sound waves in a sound wave band of 20 Hz to 24 kHz, wherein the symbol comprises a first digital code having a frequency which linearly or nonlinearly increases or decreases with time, and a second digital code having a frequency which linearly or nonlinearly decreases with time when the frequency of the first digital code increases with time, or linearly or nonlinearly increases with time when the frequency of the first digital code decreases with time;

wherein each training sequence in the repeatedly outputted analogue signal is distanced from a preceding symbol by a first time interval and from a succeeding symbol by a second time interval; and wherein, after a receiving apparatus receives the repeatedly output analogue signal the predetermined number of times, the receiving apparatus demodulates the received repeatedly output analogue signal.

5. The method of claim 4, wherein the training sequence comprises at least one training sequence digital code, in which a frequency of the training sequence digital code linearly or nonlinearly increases with time or the frequency of the digital code linearly or nonlinearly decreases with time.

6. The method of claim 5, wherein the receiving apparatus demodulates the received repeatedly outputted analogue signal by detecting the symbol of each signal in the repeatedly outputted analogue signal and by detecting digital bit data based on all of the detected symbols.

7. A method for receiving sound waves, the method comprising:

receiving, by a microphone, sound waves which have been amplified by an amplifier and repeatedly outputted a predetermined number of times by a speaker in a sound wave band of 20 Hz to 24 kHz, and repeatedly outputting the received sound waves as an analogue signal; and converting the analogue signal outputted by the microphone into digital waveform data, wherein the digital waveform data comprises a time-varying signal having at least one time-varying up signal including a frequency which linearly or nonlinearly increases with time, and at least one time-varying down signal including a frequency which linearly or nonlinearly decreases with time, wherein the digital waveform data further comprises a training sequence having at least one digital code, where each training sequence in the repeatedly outputted analogue signal is distanced from a preceding time-varying signal by a first time interval and from a succeeding time-varying signal by a second time interval.

8. The method of claim 7, wherein the time-varying up signal and the time-varying down signal are configured in plural number, and one of the plurality of time-varying up signals and time-varying down signals is a training sequence.

9. The method of claim 7, further comprising:

converting the digital waveform data into frequency domain data;

detecting an envelope of the digital waveform data using a zero-filling operation with the frequency domain data;

detecting a start point of the training sequence using the detected envelope of the digital waveform data; and detecting a start point of the time-varying signal using the start point of the training sequence.

10. The method of claim 9, further comprising demodulating the repeatedly outputted analogue signal by detecting the time-varying signal of each signal in the repeatedly outputted analogue signal and by detecting digital bit data based on all of the detected time-varying signals.

11. The method of claim 10, wherein demodulating the repeatedly outputted analogue signal comprises:

detecting a first envelope by using the time varying-signal and a Fast Fourier Transform (FFT) of a time-inversed up signal of each signal in the repeatedly outputted analogue signal, and a second envelope by using the time-varying signal and FFT of a time-inversed down signal of each signal in the repeatedly outputted analogue signal; and detecting digital bit data by using all of the detected first envelopes and second envelopes.

* * * * *